United States Patent
Gronning

(10) Patent No.: US 8,843,983 B2
(45) Date of Patent: Sep. 23, 2014

(54) VIDEO DECOMPOSITION AND RECOMPOSITION

(75) Inventor: Ari Gronning, Minneapolis, MN (US)

(73) Assignee: Google Inc., Mountain View, CA (US)

(*) Notice: Subject to any disclaimer, the term of this patent is extended or adjusted under 35 U.S.C. 154(b) by 362 days.

(21) Appl. No.: 12/961,986

(22) Filed: Dec. 7, 2010

(65) Prior Publication Data

US 2011/0145878 A1 Jun. 16, 2011

Related U.S. Application Data

(60) Provisional application No. 61/285,446, filed on Dec. 10, 2009.

(51) Int. Cl.
| | |
|---|---|
| H04N 7/173 | (2011.01) |
| H04N 7/12 | (2006.01) |
| H04N 21/4402 | (2011.01) |
| H04N 21/2662 | (2011.01) |
| H04N 21/845 | (2011.01) |
| H04N 21/63 | (2011.01) |
| H04N 21/2343 | (2011.01) |

(52) U.S. Cl.
CPC ..... *H04N 21/631* (2013.01); *H04N 21/440263* (2013.01); *H04N 21/2662* (2013.01); *H04N 21/845* (2013.01); *H04N 21/234363* (2013.01)
USPC ............. 725/116; 725/98; 725/100; 725/103; 725/114; 725/118; 375/240.24; 375/240.25

(58) Field of Classification Search
USPC ........... 725/98, 100, 103, 114, 116, 118, 144, 725/148, 151; 375/240.24–240.25
See application file for complete search history.

(56) References Cited

U.S. PATENT DOCUMENTS

| | | | | |
|---|---|---|---|---|
| 7,366,172 | B2* | 4/2008 | Chou et al. .................... | 370/389 |
| 2002/0174434 | A1* | 11/2002 | Lee et al. ......................... | 725/74 |
| 2003/0055995 | A1* | 3/2003 | Ala-Honkola ................ | 709/231 |
| 2010/0135379 | A1* | 6/2010 | Fortin et al. .............. | 375/240.01 |
| 2010/0265334 | A1* | 10/2010 | Bhaskaran et al. ........... | 348/180 |

* cited by examiner

*Primary Examiner* — Gigi L Dubasky
(74) *Attorney, Agent, or Firm* — Amin, Turocy & Watson, LLP

(57) ABSTRACT

Techniques are described for a server to decompose a source video data stream to generate a plurality of video data streams. The video data streams may be combinable with one another. In particular, the frames of each plurality of video data streams may be combinable with the frames of the other plurality of video data streams. The plurality of video data streams may be available for download by a client device. The client device may combine and recompose two or more of the plurality of video data streams for presentment. In particular, the client device may combine frames from two or more of the plurality of video data streams to generate combined frames for presentment.

27 Claims, 8 Drawing Sheets

VIDEO DECOMPOSITION AND RECOMPOSITION

This application claims the benefit of U.S. Provisional Application Ser. No. 61/285,446 filed Dec. 10, 2009, the entire content of which is incorporated herein by reference.

TECHNICAL FIELD

This disclosure relates to transmission and reception of video data.

BACKGROUND

Media content providers provide media content stored on a server to users via one or more computer networks. Generally, individual clients (e.g., subscribers or users) receive media content on client devices (i.e., the device used to display the media content to the user) from media content providers through network links to the source server and display the media content via a media player executing on the client device. The displaying of media content is referred to as playback.

The source server stores copies of the media content as a media file. To transmit the media file, the source server transmits the media file on the network according to the encoded bit rate of the media file. In other words, when source server transmits the media file to client devices, the source server consumes the necessary bandwidth on the network based on the encoded bit rate of the media file to transmit the media file to client devices.

The client devices connect with the network at an established maximum throughput rate. The maximum throughput rate refers the maximum bit rate at which the client devices download the media file from the network. The established maximum throughput rate is based on either underlying technology of the link between the client devices and the network or contracted service levels for the clients. Actual throughput is the throughput rate at which the network conveys the data from the content provider, e.g., source server, to the individual client. The actual throughput to the client may only be a fraction of the maximum throughput based on environmental conditions and competing network traffic.

Since the actual throughput may vary based on environmental conditions and competing network traffic, the rate at which a client's media player must consume (i.e., receive and play) media over a network connection, be it a constant rate or an average rate, to achieve uninterrupted playback may exceed the actual throughput rate of the link between the client device and the network. In other words, the bandwidth required to transmit the media file may exceed the actual throughput rate to the client device from the network. In these situations, the media player must pause to wait for more data from the media content provider to arrive before it can continue to playback the media content. This pause, often referred to as buffering or re-buffering, can greatly diminish the enjoyment of media viewing.

SUMMARY

In general, this disclosure describes techniques for decomposing a source video stream into a plurality of video streams. Each video stream may be decoded to represent video content that is substantially similar to the video content of the source video stream; however, the video content quality of each decoded video stream may be poorer than the video content quality of the source video stream. Each video stream can be downloaded and viewed by the client. The client device may download one or more video streams at the same time. In examples where the client device downloads two or more video streams, the video streams are configured to be combinable by the client device. The combined video stream may represent video content that is higher video content quality than the video content quality of any single video stream downloaded by the client device.

In one aspect, the disclosure is directed to a method comprising decomposing, with at least one encoding unit, a plurality of frames of a source video data stream into at least a first set of a plurality of frames and a second set of a plurality of frames, such that at least one frame of the first set of the plurality of frames is combinable with at least one frame of the second set of the plurality of frames to render a combined frame, combining, with the at least one encoding unit, the first set of the plurality of frames to form a first video data stream, and combining, with the at least one encoding unit, the second set of the plurality of frames to form a second video data stream.

In one aspect, the disclosure is directed to a server comprising at least one encoding unit configured to decompose a plurality of frames of a source video data stream into at least a first set of a plurality of frames and a second set of a plurality frames such that at least one frame of the first set of plurality of frames is combinable with at least one frame of the second set of the plurality of frames to render a combined frame, combine the first set of a plurality of frames to form a first video data stream, and combine the second set of a plurality of frames to form a second video data stream, and a transmitter to transmit the first and second video data streams.

In one aspect, the disclosure is directed to a computer-readable storage medium comprising instructions that cause one or more processors to decompose a plurality of frames of a source video data stream into at least a first set of a plurality of frames and a second set of a plurality of frames such that at least one frame of the first set of the plurality of frames is combinable with at least one frame of the second set of the plurality of frames to render a combined frame, combine the first set of the plurality of frames to form a first video data stream, and combine the second set of the plurality of frames to form a second video data stream.

In one aspect, the disclosure is directed to a method comprising receiving, with a client device, at least a first video data stream comprising a first set of decomposed frames and a second video data stream comprising a second set of decomposed frames, recomposing, with the client device, at least one frame of the first set of decomposed frames with at least one frame of the second set of decomposed frames to generate a recomposed frame, and presenting, with the client device, the recomposed frame.

In one aspect, the disclosure is directed to a client device comprising at least one processor, a download agent comprising a source manager configured in the at least one processor to receive at least a first video data stream comprising a first set of decomposed frames and a second video data stream comprising a second set of decomposed frames, and a stream agent configured in the at least one processor to recompose at least one frame of the first set of decomposed frames with at least one frame of the second set of decomposed frames to generate a recomposed frame, and a media player configured in the at least one processor to present the recomposed frame.

In one aspect, the disclosure is directed to a computer-readable storage medium comprising instructions that cause one or more processors to receive at least a first video data stream comprising a first set of decomposed frames and a second video data stream comprising a second set of decomposed frames, recompose at least one frame of the first set of decomposed frames with at least one frame of the second set of decomposed frames to generate a recomposed frame, and present the recomposed frame.

In one aspect, this disclosure is directed to a system comprising a server comprising at least one encoding unit configured to decompose a plurality of frames of a source video data stream into at least a first set of decomposed frames and a second set of decomposed frames such that at least one frame of the first set of decomposed frames is combinable with at least one frame of the second set of decomposed frames to render a combined frame, combine the first set of decomposed frames to form a first video data stream, and combine the second set of decomposed frames to form a second video data stream, and a transmitter to transmit the first and second video data streams, at least one client device comprising at least one processor, a download agent comprising a source manager configured in the at least one processor to receive at least a first video data stream comprising a first set of decomposed frames and a second video data stream comprising a second set of decomposed frames, and a stream agent configured in the at least one processor to recompose at least one frame of the first set of decomposed frames with at least one frame of the second set of decomposed frames to generate a recomposed frame, and a media player configured in the at least one processor to present the recomposed frame, and a network that receives the first and second video data streams from the server and transmits the first and second video data streams to the at least one client device.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
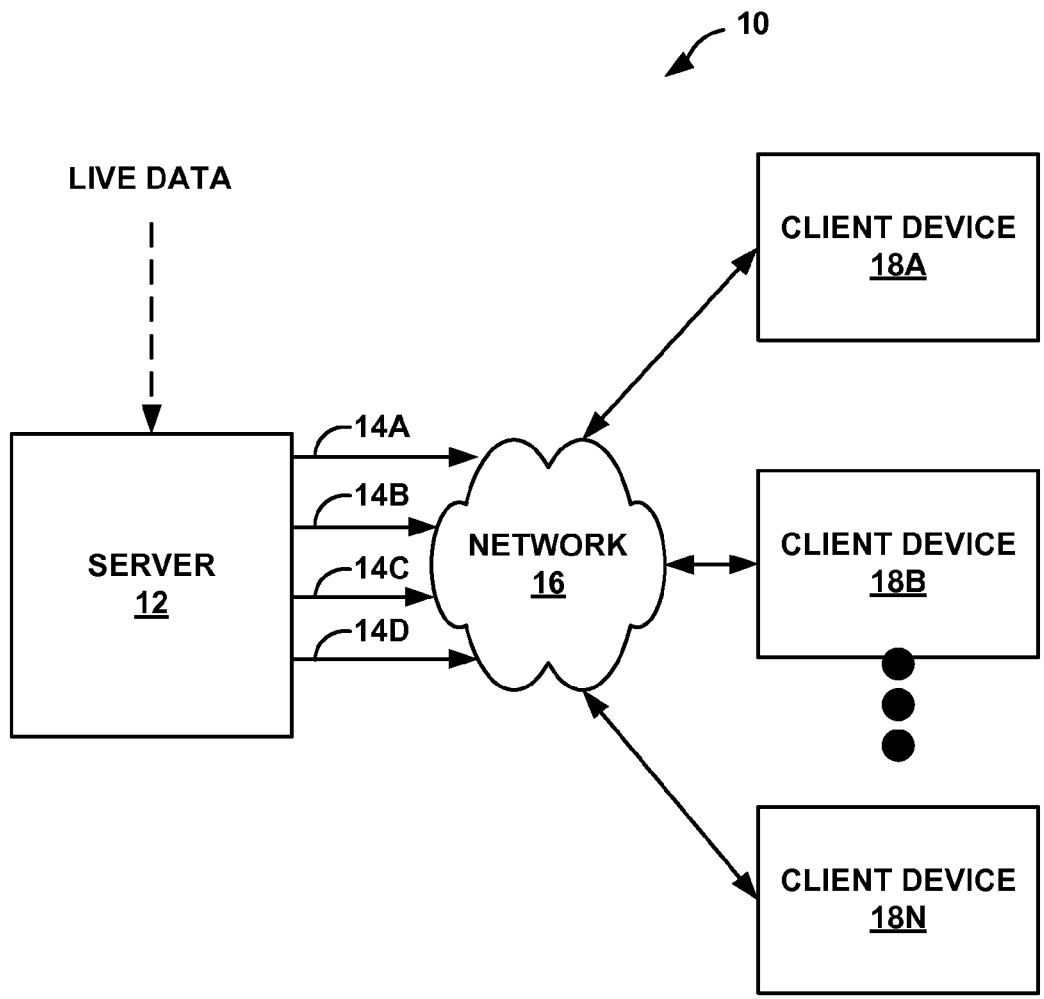
FIG. 1 is a schematic diagram illustrating an exemplary system for transmitting media content.

FIG. 1 is a schematic diagram illustrating an exemplary system 10 for transmitting media content. Server 12 transmits media content, e.g., video content, to client devices 18A-18N (collectively referred to as client devices 18) via network 16. Network 16 may be a wide variety of different types of networks. For example, network 16 may be the Internet, a content delivery network, a wide-area network, a wireless network, or another type of network. In some examples, server 12 may receive live video from an event, shown as a dashed line in FIG. 1. For example, video content of a sporting event or a concert may be transmitted to the server 12. The video content that server 12 receives may comprise a plurality of frames that represent the video content, or the video content that server 12 receives may not comprise a plurality of frames. In examples where the video content does not comprise a plurality of frames, server 12 may encode the video content to generate the plurality of frames, where each frame represents an instance, e.g., a picture, of the video content.

In some examples, where the video content is not live video content, server 12 may store encoded video content. For example, server 12 stores a TV show, a movie, or other similar video content. In examples where the video content is not live video content, the video content may comprise a plurality of frames where some frames represent an instance of the video content.

A source video data stream is a media file that comprises the plurality of frames of the video content. The plurality of frames that each represent an instance of the video content, e.g., a picture, are generated based on known encoding techniques. One type of frame is referred to as a an intra picture frame that can be decoded without reference to other frames and may, for example, provide an entire encoded picture. In the context of H.264 coding, intra picture frames are referred to as "i-frames." Between each i-frame are predicted pictures, e.g., p-frames, or bi-predicted pictures, e.g., b-frames, that generally contain image data and motion vector displacements that are relative to the previous i-frame in the video content. Another example of a frame is a bitmap. A bitmap may, in at least some instances, be considered as an i-frame. For purposes of illustration and description, this disclosure refers to bitmap frames. However, aspects of this disclosure should not be considered limited to bitmap frames. Aspects of this disclosure are extendable to other types of frames, as well.

In some examples, the source video data stream may be divided into video packets or video slices. Each video packet or slice is individually accessible and retrievable. Each video packet or slice includes frames of the plurality of frames. As one example, each video packet or slice may include five minutes of video content. Accordingly, the first video packet or slice may include frames for the first five minutes of video content, the second video packet or slice may include frames for the second five minutes of video content, and so on. As another example, each video packet or slice may include frames for five megabits (MBs) of video content. Accordingly, the first video packet or slice may include frames for the first five MBs of video content, the second video packet or slice may include frames for the second five MBs of video content, and on. Five minutes of video content and five MBs of video content for each video packet or slice are provided for example purposes only and should not be considered as limiting.

The source video data stream is configured for a certain playback rate. The playback rate is defined as the rate at which a media player, or similar device, on each one of client devices 18 displays the video data stream. The playback rate is measured as the number of bits per unit of time necessary for client devices 18 to display video content for uninterrupted playback. The source video data stream is also configured for a certain bit rate. Bit rate and playback rate should not be confused. Bit rate is the number of bits per unit of time necessary to transmit the video data stream. In other words, the bit rate defines the amount of bandwidth server 12 needs to consume to transmit the video data stream. The bit rate of the source video data stream may be proportional to the playback rate of the source video data stream. Accordingly, a relatively high playback rate means a relatively high bit rate, and a relatively low playback rate means a relatively low bit rate. Also, the visual quality of the video content may be proportional to the playback rate of the video data stream. Accordingly, a relatively high playback rate means high visual quality, and a relatively low playback rate means low visual quality.

In accordance with this disclosure, server 12 decomposes the source video data stream into a plurality of video data streams, thereby decomposing the source video data stream. Techniques for decomposing the source video data stream into a plurality of video data streams are provided in more detail with respect to FIG. 2. Each of the plurality of video data streams, when decoded by client devices 18, represents substantially similar video content of the source video data stream, but is encoded for lower playback rates. Since the playback rates of each of the plurality of video data streams is less than the playback rate of the source video data stream, the bit rate of each of the plurality of video data streams is less than the bit rate of the source video data stream. In some examples, the playback rate of the each of the plurality of video data stream may be substantially the same. Also, in some examples, the sum of the playback rates of each of the plurality of data streams may equal the playback rate of the source video stream.

Server 12 stores each one of the plurality of video data streams, and each one of client devices 18 may download one or more of the plurality of video data streams from server 12. As shown in FIG. 1, server 12 connects to network 16 via network links 14A-14D (collectively referred to as network links 14). Though four network links 14 are shown in FIG. 1, aspects of this disclosure are not so limited. There may be more than or fewer than four network links 14. Server 12 transmits one or more of the plurality of video data streams to client devices 18 via network links 14. In some examples, the number of network links 14 may be based on the number of the plurality of video data streams. For example, assuming server 12 decomposes the source video data stream into four video data streams, server 12 may transmit the first video data stream on network link 14A, the second video data stream on network link 14B, and so on.

To download video content, each one of client devices 18 may establish one or more connections, such as one or more transmission control protocol and Internet protocol (TCP/IP) connections, to server 12 via one or more network links 14. The TCP/IP connections are provided for example purposes only and should not be considered as limiting. Other examples of network connections may also be used in accordance with this disclosure. As described above, each one of client devices 18 may connect to network 16 at an established throughput rate. However, the throughput rate for each one of client devices 18 may be different. For example, client device 18A may connect to network 16 at a high throughput rate, client device 18B may connect at a medium throughput rate, and client device 18N may connect at a low throughput rate. Based on the throughput rate of client devices 18, each one of client devices 18 may download the video data streams from one or more network links 14. For example, due to the low throughput rate of client device 18N, client device 18N may only download the video data stream provided on network link 14A. Due to the medium throughput rate of client device 18B, client device 18B may download the video data streams provided on network links 14A and 14B. Due to the high throughput rate of client device 18A, client device 18A may download the video data streams provided on network links 14A-D.

In accordance with this disclosure, two or more of the plurality of video data streams may be combinable to render a higher visual quality video data stream, and accordingly the combined video data stream comprises a playback rate that is greater than the playback rate of the video data streams that were combined. In the previous example, client device 18B downloaded the video data streams from network link 14A and 14B. In accordance with this disclosure, client device 18B may combine the video data streams from network link 14A and 14B into a combined video data stream. The playback rate of the combined video data stream is greater than the playback rate of either of the video data streams from network link 14A and 14B. Accordingly, the visual video quality of the combined video data stream is greater than the visual video quality of either of the video data streams from network link 14A and 14B.

In some examples, the throughput rate of client devices 18 may change. For example, the throughput rate of client device 18B may decrease during download due to network traffic or lack of computing resources. In such examples, instead of downloading from both network link 14A and 14B, as described in the previous example, client device 18B may terminate its connection (e.g., TCP/IP connection) with network link 14B and only maintain its connection with network link 14A, or vice-versa. In such examples, the visual quality of the video content may decrease because client device 18B is only downloading the video stream provided on network link 14A. However, client device 18B may avoid any rebuffering delays even though its throughput rate decreased because client 18B is still downloading the video content from network link 14A and displaying the downloaded video content. As described above, the video content provided on network link 14A represents substantially the same video content as the source video data stream, albeit at a poorer visual quality.

As another example, the throughput rate of client device 18B may increase during download. In such examples, client device 18B may establish another connection to network link 14C, and download video data streams provided on network link 14A, 14B, and 14C. In such examples, client device 18B may combine the video data streams provided on network link 14A, 14B, and 14C to render a combined video data stream. The visual quality of the combined video data stream may be greater than the visual quality of any of the video data streams.

Aspects of this disclosure provide various advantages. The advantages may be particularly realized for the so-called "first mile problem." The first mile problem refers to the bandwidth utilization by the server to transmit video content to the network for eventual transmission to the client devices. By transmitting a plurality of video data streams that are decomposed from the source video data stream and are combinable, server 12 may reduce the amount of bandwidth it consumes on network 16 to provide video content to client devices 18. A media content provider that controls server 12 pays a service provider that controls network 16 based on the amount of bandwidth that server 12 consumes on network 16. By reducing the amount of bandwidth that server 12 consumes on network 16, the media content provider may reduce its costs.

For example in conventional systems, a server would transmit a plurality of video data streams that were each encoded for a different playback rate. For example, the server would generate and transmit a 4 megabit per second (Mbps) playback rate representation, a 3 Mbps playback rate representation, a 2 Mbps playback rate representation, and a 1 Mbps playback rate representation of the source video data stream. However, none of the various different representations are combinable in conventional systems. Accordingly, the client device with a high throughput rate would download the 4 Mbps playback rate representation, the client device with a medium throughput rate would download the 3 Mbps playback rate representation, and the client device with a low throughput rate would download the 1 Mbps playback rate representation. The bandwidth that the server would need to consume, in conventional systems, is the bandwidth, e.g., bit rate, necessary to transmit up to 10 Mbps playback rate representations (4 Mbps+3 Mbps+2 Mbps+1 Mbps=10 Mbps).

In accordance with this disclosure, server 12 decomposes the source video data stream into a plurality of video data streams that are combinable. For example, server 12 may generate four video data streams that are each a 1 Mbps playback rate representation of the source video data stream. Moreover, each one of the 1 Mbps playback rate representations is combinable with one or more other 1 Mbps playback rate representations. As described above, client devices 18 may download one or more of the playback rate representations. In examples where client devices 18 download two or more of the playback rate representations, client devices 18 combine the downloaded playback rate representations to render a combined video data stream with a higher playback rate.

For example, as described above, client device 18A may download all four 1 Mbps playback rate representations and combine them to render a 4 Mbps playback rate representation for display. Client device 18B may download two 1 Mbps playback rate representations and combine them to render a 2 Mbps playback rate representation for display. Accordingly, client devices 18 may render a video data stream with a playback rate of 4 Mbps by downloading all four representations, 3 Mbps by downloading three of the four representations, 2 Mbps by downloading two of the four representations, or 1 Mbps by downloading one of the four representations. The playback rate and the number of representations are provided only for example purposes and should not be considered as limiting.

To transmit the four playback rate representations, in accordance with this disclosure, server 12 may need to consume the bandwidth necessary to transmit up to 4 Mbps playback rate representations (1 Mbps+1 Mbps+1 Mbps+1 Mbps). As described above, in conventional systems, the server would need to consume bandwidth to transmit 10 Mbps playback rate representations, while aspects of this disclosure, require server 12 to consume bandwidth to transmit 4 Mbps playback rate representations, as one non-limiting example. In either the conventional techniques or techniques of this disclosure, based on the throughput rate, the client device can display high visual quality video content, e.g., a 4 Mbps playback rate representation or low visual quality video content, e.g., a 1 Mbps playback rate representation. However, the bandwidth that the server needs to consume on the network is substantially less in accordance with techniques of this disclosure compared to conventional techniques. Since the media content provider pays the service provider based on the amount of bandwidth the media content provider consumes on the network, the cost to the media content provider may decrease by utilizing the techniques of this disclosure.

Furthermore, aspects of this disclosure also promote efficient memory usage. In conventional systems, the server stores all the various playback rate representations. Though not true in all cases, for ease of illustration, assume that the bit rate of the various playback rate representations is equal to the playback rate. Accordingly, the bit rates, in this conventional system example, are 4 Mbps, 3 Mbps, 2 Mbps, and 1 Mbps for the various playback rate representations. Further assume that the duration of the video content is 10 seconds (s). Accordingly, the server needs to store a 100 megabits of data (4 Mbps*10 s+3 Mbps*10 s+2 Mbps*10 s+1 Mbps*10 s=100 megabits) in a conventional system.

Keeping with the previous example, in accordance with this disclosure, server 12 may generate four playback rate representations that each comprise a playback rate of 1 Mbps. Assuming that the bit rate is the same as the playback rate, which is not necessarily always true, if the duration of the video content is 10 seconds, then server 12 needs to store 40 megabits of data which is less than the amount of data that the server needs to store in conventional systems. Accordingly, in accordance with this disclosure, server 12 may need to store less data compared to conventional systems while allowing client devices 18 to display a range of visual quality video content.

Figure 2:
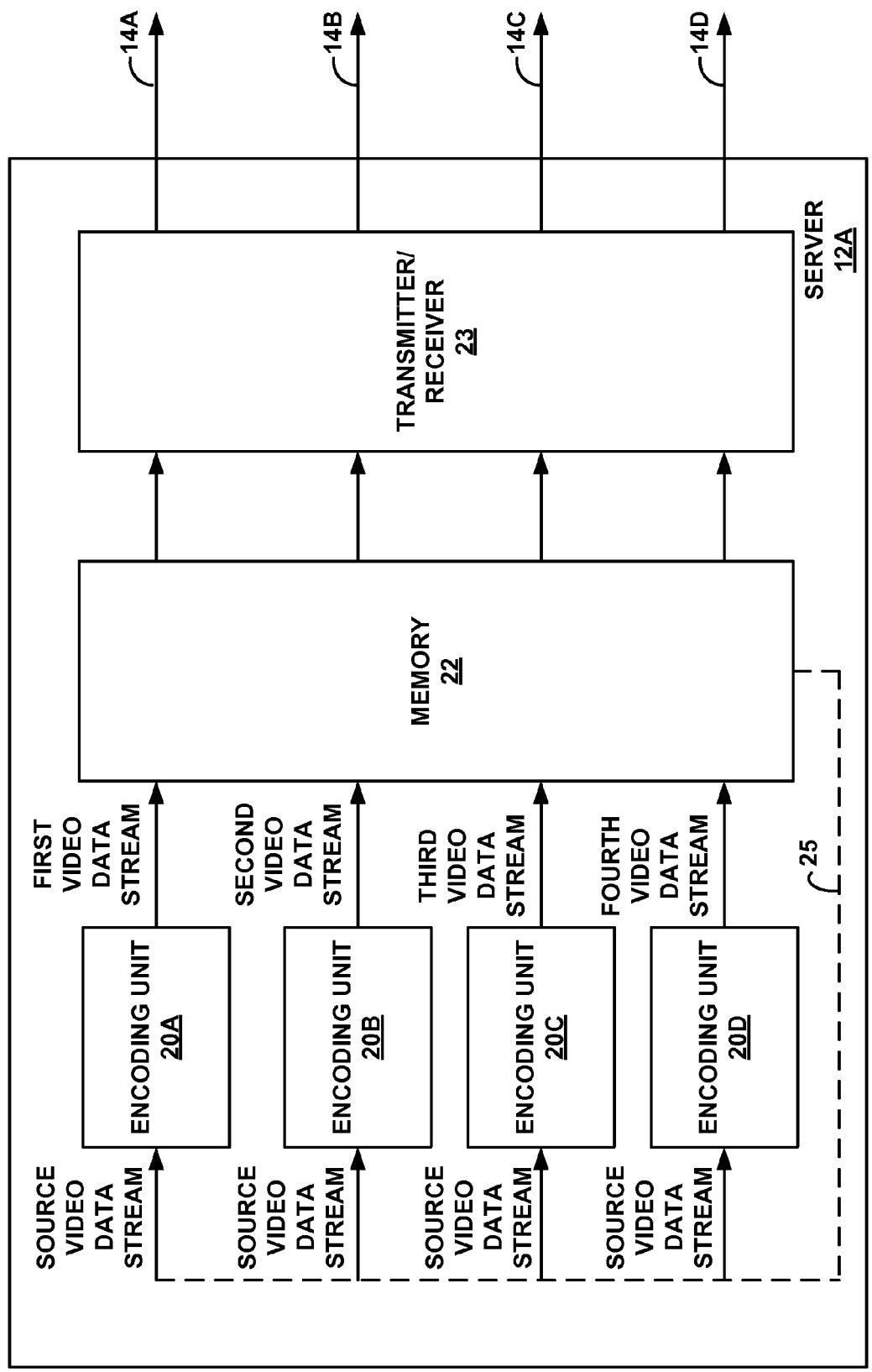
FIG. 2 is a block diagram illustrating an example server.

FIG. 2 is a block diagram illustrating an example server 12A. Server 12A is an example of server 12 (FIG. 1). Server 12A comprises encoding units 20A-20D (collectively referred to as encoding units 20), memory 22, and transceiver/receiver (Tx/Rx) 23. Tx/Rx 23 facilitates data transfer between server 12 and client devices 18 via network 16. For example, Tx/Rx 23 may be connected to TCP/IP connections established by client devices 18, i.e., network links 14. In this manner, Tx/Rx 23 receives communication from client devices 18 and is able to transmit video content to client devices 18.

Memory 22 may be a computer-readable storage medium such as a Random Access Memory unit, a disk drive, an optical disc, a floppy disk, a Flash memory unit, or another type of computer-readable storage medium. In some examples, memory 22 may store the source video data stream. For example, memory 22 may store the video content of a television show. Though not shown explicitly in FIG. 2, in such examples, memory 22 may provide the source video data stream to encoding units 20. However, it may not be necessary for memory 22 to store the source video data stream. As described above, in some examples, server 12A may receive the source video data stream from an external source, e.g., a live event or other types of video content. The source video data stream that server 12A receives may be encoded with a plurality of frames or may not be encoded with a plurality of frames.

In some aspects of this disclosure, encoding units 20 receive the source video data stream. In some examples, the source video data stream may be provided by memory 22, shown as dashed link 25. In other examples, the source video data stream may be provided by another device. In examples where the source video data stream does not comprise frames, encoding units 20 may generate the frames. Each one of encoding units 20 may be a microprocessor that includes one or more cores, an application-specific integrated circuit (ASIC), co-processor, or another type of integrated circuit. Each one of encoding units 20 may execute instructions stored in memory 22. When each one of encoding units 20 executes instructions stored in memory 22, the instructions may cause each one of encoding unit 20 to perform one or more actions. Furthermore, rather than each one of encoding units 20 comprising an integrated circuit, in some examples, encoding units 20 may be formed on a single integrated circuit, e.g., a microprocessor, ASIC, co-processor, or another type of integrated circuit. Moreover, although FIG. 2 shows server 12A comprising four encoding units 20, aspects of this disclosure are not so limited. In some examples, server 12A may comprise more or fewer encoding units 20.

Each one of encoding units 20 decompose the source video data stream to generate a plurality of video data streams. Each video data stream may be transmitted on one of network links 14. For example, encoding unit 20A may transmit the first video data stream on network link 14A, encoding unit 20B may transmit the second video data stream on network link 14B, and so on.

To decompose the source video data stream, each one of encoding units 20 may decompose some or all of the plurality of frames of the source video data stream. In some examples, the plurality of frames of the video data stream may be bitmap frames. For purposes of illustration, aspects of this disclosure are described with respect to bitmap frames. However, aspects of this disclosure should not be considered limited to bitmap frames. In some examples, each one of encoding units 20 may combine some of the frames of the plurality of frames into video packets or slices that are individually accessible and retrievable. The video packets or slices of each video data stream may be arranged sequentially. Each video packet or slice may include two minutes of video content or three MBs of video content, as one non-limiting example. In this example, the first video packet or slice may include the first two minutes or first three MBs of video content. The second video packet or slice may include the second two minutes or second three MBs of video content, and so on.

Figure 3:
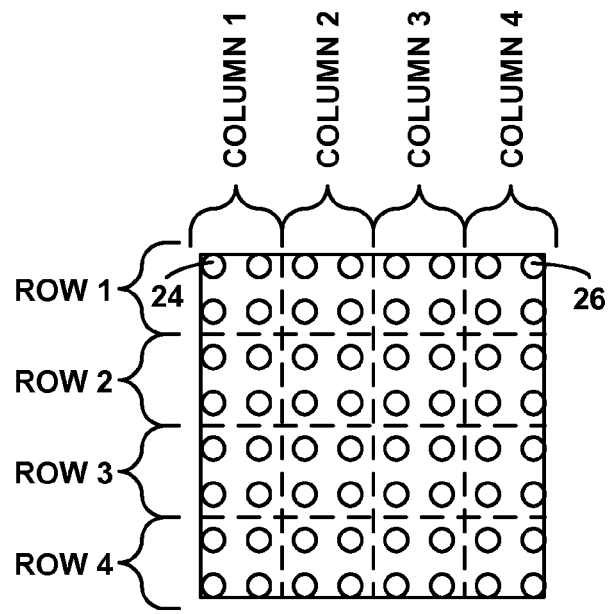
FIG. 3 is an example illustration of a frame.

A bitmap frame comprises a two dimensional matrix of pixels. Each pixel is assigned a pixel value. The pixel value may comprise 1, 4, 8, 16, 24, 32, 48, or 64 bits to represent the color of the pixel. The pixel value may comprise more or fewer bits in different examples. Each one of encoding units 20 may be configured to divide the two dimensional matrix of pixels of a bitmap frame into a plurality of blocks, as shown in FIG. 3 by the dashed lines. FIG. 3 is an example illustration of a frame. For example, as shown in FIG. 3, assume the bitmap frame comprises an 8×8 matrix of pixels. Each one of encoding units 20 may be configured to divide the 8×8 matrix of pixels into 16 blocks of 2×2 matrix of pixels. For description purposes, the blocks are referred numerically starting from the top left corner in a left-to-right and top-to-bottom fashion.

For example, block 1 is located at row 1, column 1, block 4 is located at row 1, column 4, block 5 is located at row 2, column 1, and block 16 is located at row 4, column 4. Also, for description purposes, the pixels within each block are referenced based on their Cartesian coordinates relative to the block. For example, pixel 24, in FIG. 3, is referenced as (1, 1) in block 1. As another example, pixel 26, in FIG. 3, is referenced as (2, 1) in block 4. The size of the matrix of the bitmap, the number of blocks in the bitmap, and the size of the blocks are all described for illustration purposes only, and should not be considered limiting.

For a bitmap frame of the source video data stream, each one of encoding units 20 may select a pixel from each block and delete all other pixel values, such that the pixel value for only the selected pixel is maintained. Each one of encoding units 20 may select a different pixel from each block to maintain. Each one of encoding units 20 may render a frame that comprises the pixels selected by that encoding unit 20 from the frame of the source video data stream. Notably, the size of the frame rendered by the encoding units may be a fraction of the size of the frame of the source video data stream. Each one of encoding units 20 may then render frames from subsequent frames of the source video data stream in a substantially similar fashion.

Each one of encoding units 20 may combine the rendered frames to generate a plurality of video data streams. In some examples, memory 22 may store the generated plurality of video data streams. In some examples, server 12 may transmit each one of the plurality of video data streams via network links 14 to client devices 18. For example, the video data stream generated by encoding unit 20A may be stored in memory 22 and may be provided as a first video data stream on network link 14A via Tx/Rx 23. Similarly, the video data streams generated by encoding units 20B-20D may be stored in memory 22 and may be provided as second, third, and fourth video data streams on network links 14B-14D, respectively, via Tx/Rx 23.

In one example, encoding unit 20A may select pixels located at (1, 1) in all 16 blocks, encoding unit 20B may select pixels located at (1, 2) in all 16 blocks, encoding unit 20C may select pixels located at (2, 1) in all 16 blocks, and encoding unit 20D may select pixels located at (2, 2) in all 16 blocks. Encoding unit 20A may render a frame comprising only pixels located at the (1, 1) for all 16 blocks. Accordingly, the size of the frame rendered by encoding unit 20A is 4×4. Similarly, encoding unit 20B may render a frame comprising only pixels located at (1, 2) for all 16 blocks. Accordingly, the size of the frame rendered by encoding unit 20B is 4×4. Encoding units 20C and 20D may function substantially similar to encoding units 20A and 20B but would render frames comprising pixels located at (2, 1) and (2, 2), respectively.

In another example, rather than selecting the same pixel in each block, each one of encoding units 20 may select different pixels in some of the blocks and delete all other pixel values. Also, each one of encoding units 20 may select different pixels for a given block compared to all the other encoding units 20. For example, encoding unit 20A may select pixel (1, 1) from block 1, pixel (1, 2) from block 2, pixel (2, 1) from block 3, pixel (2, 2) from block 4, and repeat for all remaining blocks. In this example, encoding unit 20B may select pixel (1, 2) from block 1, pixel (2, 1) from block 2, pixel (2, 2) from block 3, pixel (1, 1) from block 4, and repeat for all remaining blocks.

Keeping with the example, encoding unit 20C may select pixel (2, 1) from block 1, pixel (2, 2) from block 2, pixel (1, 1) from block 3, pixel (1, 2) from block 4, and repeat for all remaining blocks. Encoding unit 20D may select pixel (2, 2) from block 1, pixel (1, 1) from block 2, pixel (1, 2) from block 3, pixel (2, 1) from block 4, and repeat for all remaining blocks. As described above, each one of encoding units 20 may delete the pixel values for all other pixels. Accordingly, the size of each frame rendered by encoding units 20 is 4×4. Other permutations and combinations are possible and are contemplated by this disclosure.

The technique of maintaining a pixel and deleting all other pixel values may be repeated by each one of the encoding units 20 for one or more of the frames of the source video data stream. Accordingly, each of the encoding units 20 generates a plurality of frames that has pixel values for a fraction of the pixel values from the source video data stream. In the example provided above, each of the encoding units 20 generates the plurality of frames, where each frame comprises one fourth of the pixel values of the frames from the source video data stream. For example, assume that each pixel value comprises 4 bits, as a non-limiting example. Accordingly, each bitmap frame of the source video data stream comprises 256 bits of data (8×8×4). In the examples provided above, each one of encoding units 20 renders a frame with size 4×4.

Accordingly, each of the frames rendered by encoding units 20 comprises 64 bits of data (4×4×4), in this non-limiting example.

In accordance with this disclosure, each frame rendered by encoding units 20 represents a frame from the source video data stream. However, as in the previous non-limiting example, since the number of bits in each frame of the video data streams comprise approximately one fourth of the number of bits in each frame of the source video data stream, the visual quality of each of the video data streams may be less than the visual quality of the source video data stream.

As described above, the source video data stream comprises a playback rate that represents the number of bits per unit of time that need to be displayed. Since the number of bits in each frame of the video data stream is less than the number of bits in each frame of the source video data stream, the number of bits per unit of time that need to be displayed in each of the video data streams is less than the number of bits per unit of time that need to be displayed of the source video data stream. Accordingly, the playback rate of each of the video data streams, e.g., the first, second, third, and fourth video data streams, is less than the playback rate of the source video data stream.

Each one of encoding units 20 may store its generated video data stream in memory 22. When Tx/Rx 23 receives a request from client devices 18 for the video content, Tx/Rx 23 may provide the appropriate video data streams stored in memory 22 based on the throughput rate of the requesting client devices 18. For example, when client device 18N requests the video content, client device 18N may have only established one TCP/IP connection due to its low throughput rate. Tx/Rx 23 may, in this case, transmit only one of the video data streams to client device 18N via network link 14A. Similarly, when client device 18B requests the video content, client device 18B may have established two TCP/IP connections due to its medium throughput rate. Tx/Rx 23 may transmit two video data streams to client device 18B via network link 14A and 14B.

In addition to generating the video data streams from the source video data stream, in some examples, encoding units 20 may generate a timestamp for each frame. The timestamps indicate the temporal moment when that frame is displayed during playback. Each one of encoding units 20 may associate a frame with its corresponding timestamp. For example, the first frame generated by encoding unit 20A may be associated with a timestamp of zero seconds, and the tenth frame generated by encoding unit 20A may be associated with a timestamp of two seconds, assuming, in this case, that two seconds of video content was displayed between the display of the first frame and the tenth frame. Encoding units 20B-20D may also generate timestamps that are associated with each frame. The timestamps and their associated frames for each of the plurality of video streams may be stored in memory 22 as metadata.

In some examples, instead of or in addition to generating timestamps, encoding units 20 may generate datastamps. Datastamps indicate the amount of data that has been transmitted before a current frame is displayed. Each one of encoding units 20 may associate a frame with its corresponding datastamp and/or timestamp. For example, the first frame generated by encoding unit 20A may be associated with datastamp 0 bits to 10 bits, and the tenth frame generated by encoding unit 20A may be associated with datastamp 400 bits to 410 bits, assuming that 400 bits of video content was displayed between the display of the first frame and the tenth frame. Encoding units 20B-20D may also generate datastamps, along with or instead of timestamps, that are associated with each frame. The datastamps and their associated frames for each of the plurality of video streams may be stored in memory 22 as metadata.

In some examples, metadata stored in memory 22 may be separately downloadable by client devices 18. For example, each one of client devices 18 may establish a separate TCP/IP connection to download just the metadata stored in memory 22. The metadata may not necessarily be a large file, and download of the metadata may be relatively quick. Accordingly, server 12 may not need to consume much additional bandwidth to transmit the metadata. In some alternate examples, the metadata may be added to each one of the plurality of video streams generated by encoding units 20. For example, the metadata may be added at the beginning of each one of the plurality of video streams.

Examples where memory 22 stores timestamps and datastamps may be particularly useful for examples where the source video content is not live content. For example, if the source video stream is already stored in memory 22, memory 22 may store the timestamps and datastamps and an indication of which frames are associated with which timestamps and datastamps because the entire source video stream is already available.

However, if the source video data stream is video content for a live event, memory 22 may not be able to store the entire source video data stream, because the live event is still occurring at the time that server 12A receives the source video data stream. In such examples, each frame generated by encoding units 20 may include its associated timestamp and/or datastamp. The timestamp and/or datastamp may be added as a header of the frame. In some examples, even when the content is not video content from a live event, the timestamps and/or datastamps may be added as a header for each frame rather than storing the timestamps and/or datastamps separately from the video data streams.

As described in more detail below, the timestamps and/or datastamps aid client devices 18 to dynamically open additional TCP/IP connections to download additional video data streams. For example, due to the low throughput rate of client device 18N, client device 18N may download the video data stream provided on network link 14A by Tx/Rx 23. However, at some later point in time, during the download, the throughput rate of client device 18N may increase. In accordance with this disclosure, client device 18N may establish, e.g., open, an additional TCP/IP connection to download the data provided on network link 14B by Tx/Rx 23.

When client device 18N establishes another TCP/IP connection, client device 18N may check the timestamp and/or datastamp associated with the latest frame that client device 18N downloaded. Client device 18N may request for the frame that is immediately subsequent to the latest downloaded frame from the newly established TCP/IP connection. Client device 18N may then download all subsequent frames from all established TCP/IP connections. For example, client device 18N may originally be in the process of downloading the video stream provided via network link 14A. Client device 18N may have downloaded up to bit 500 of the video content which corresponds to the fifth frame. Due to increase in the throughput rate of client device 18N, client device 18N may establish another TCP/IP connection, i.e., network link 14B. Since client device 18N has already downloaded up to bit 500 of the video content, client device 18N may request for the sixth frame from the video data stream provided on network link 14B. Client device 18N may then download the sixth frame and subsequent frames to the sixth frame via network links 14A and 14B.

In the preceding example, client device 18N receives the frames one through five of the first video data stream from network link 14A. Client device 18N receives frame six and subsequent frames of the first video data stream and the second video data stream from both network link 14A and network link 14B. Client device 18N combines the first video data stream and the second video data stream to display a combined video data stream. As noted above, the combined video data stream comprises higher visual quality compared to either the first video data stream or the second video data stream.

Figure 4A:
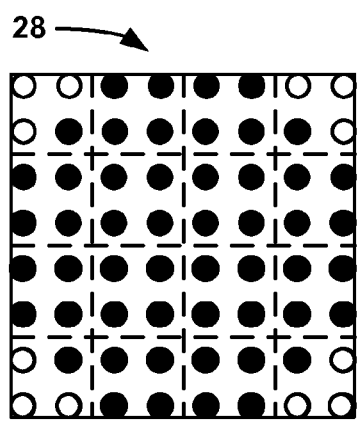
FIG. 4A is an illustration of a bitmap frame comprising a picture.

FIG. 4A is an illustration of a bitmap frame 28 comprising a picture. The bitmap frame of FIG. 4A may be a bitmap frame of the source video data stream. The picture within bitmap frame 28 is represented by the pixels shaded black. The remaining pixels in bitmap frame 28 are shaded white. Bitmap frame 28 may be divided into a plurality of blocks as shown by the dashed lines. The two-dimensional size of each block may be 2×2 as one non-limiting example, i.e., each block comprises four pixels. FIGS. 4B-4E illustrate the bitmap frame of FIG. 4A decomposed into four bitmap frames. Encoding unit 20A may generate decomposed bitmap frame 30 of FIG. 4B. Decomposed bitmap frame 30 of FIG. 4B includes the pixels located at (1, 1) for each block of bitmap frame 28. Encoding unit 20B may generate decomposed bitmap frame 32 of FIG. 4C.

Figure 4B:
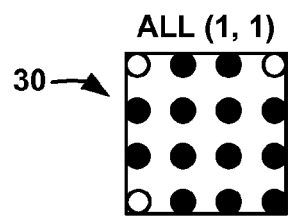
FIGS. 4B-4E illustrate the bitmap frame of FIG. 4A decomposed into four bitmap frames.
Figure 4C:
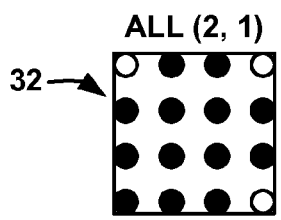
Figure 4D:
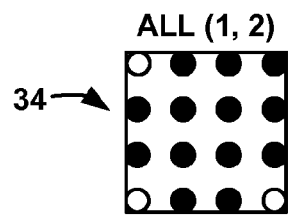
Figure 4E:
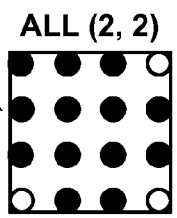

Decomposed bitmap frame 32 of FIG. 4C includes the pixels located at (2, 1) for each block of bitmap frame 28. Encoding unit 20C may generate decomposed bitmap frame 34 of FIG. 4D. Decomposed bitmap frame 34 of FIG. 4D includes the pixels located at (1, 2) for each block of bitmap frame 28. Encoding unit 20D may generate decomposed bitmap frame 36 of FIG. 4E. Decomposed bitmap frame 36 of FIG. 4E includes the pixels located at (2, 2) for each block of bitmap frame 28.

Referring back to FIG. 2, as described above, memory 22 stores metadata that includes timestamps and/or datastamps for each frame of the video data streams. The metadata may be separately downloadable or may be added at the beginning of the video data stream or may be added as a header at the beginning of each frame. In some examples, the metadata may also include an indication of which pixels of a frame of the source video data stream are represented in the decomposed frame and the size of the decomposed frame. For example, based on the illustration provided in FIGS. 4B-4D, the metadata for the first video data stream generated by encoding unit 20A may include an indication that the source video data stream frame, e.g., bitmap frame 28, was divided into blocks of 2×2 pixels and that the first video data stream includes pixels located at (1, 1) within each block of 2×2 pixels. The metadata may also include that the size of the frame is 4×4. Similarly, the metadata for the second video data stream generated by encoding unit 20B may include an indication that bitmap frame 28 was divided into blocks of 2×2 pixels and that the second video data stream includes pixels located at (1, 2) within each block of 2×2 pixels. The metadata may also include that the size of the frame is 4×4.

Figure 5:
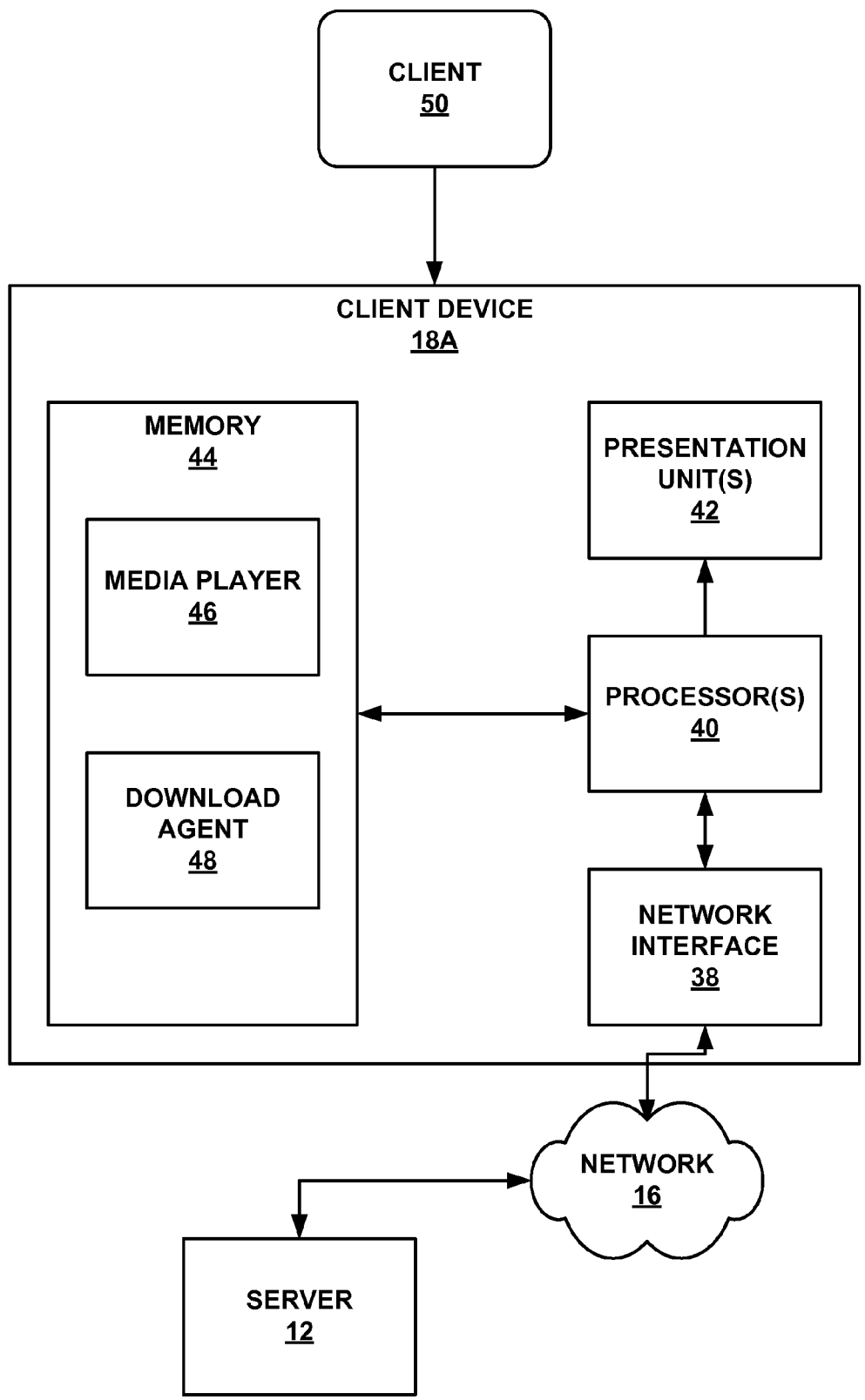
FIG. 5 is a block diagram illustrating an exemplary client device.

FIG. 5 is a block diagram illustrating an exemplary client device 18A. Client devices 18B-18N may be substantially similar to client device 18A. In the example of FIG. 5, client device 18A includes a network interface 38, processor(s) 40, a presentation unit(s) 42, and a memory 44. Client device 18A is operated by client 50. Network interface 38 facilitates communication between client device 18A and network 16. Network interface 38 may be a variety of different types of network interface. For example, network interface 38 may be an Ethernet interface, a WiFi interface, a token ring interface, a fiber optic interface, a Bluetooth interface, a Wireless Broadband interface, a WiMax interface, or another type of network interface. Memory 44 may be a computer-readable storage medium such as a Random Access Memory unit, a disk drive, an optical disc, a floppy disk, a Flash memory unit, or another type of computer-readable storage medium.

Processor(s) 40 may be one or more a microprocessors that each include one or more cores, an application-specific integrated circuit (ASIC), co-processor, or another type of integrated circuit. Processor(s) 40 may execute instructions stored in memory 44. When processor(s) 40 executes instructions stored in memory 44, the instructions may cause processor(s) 40 to perform one or more actions. Presentation unit(s) 42 may be one or more of a computer monitor, a television set, an integrated video screen, speakers, digital signage, a video projector, or another type of unit capable of presenting media.

In the example of FIG. 5, memory 44 includes a media player 46 and a download agent 48. Media player 46 and download agent 48 may be sets of software instructions that, when executed, cause processor(s) 40 to perform various actions. For ease of explanation, when this disclosure states that media player 46 performs some action or states that download agent 48 performs some action, such phrases may be interpreted to mean that the instructions of media player 46 cause processor(s) 40 to perform the action or to mean that the instructions of download agent 48 cause processor(s) 40 to perform the action. However, it should be appreciated that in some implementations, media player 46 and/or download agent 48 may be implemented at least in part as hardware, in which case media player 46 and/or download agent 48 may perform some or all of the actions without any action by processor(s) 40. Furthermore, it should be appreciated that in some alternate implementations, media player 46 and download agent 48 may be part of a common software package. In other words, the functionality of download agent 48 may be incorporated into media player 46.

A client 50 of client device 18A may interact with media player 46 when client 50 wants client device 18A to present video content. Example commercial media player applications include Windows Media Player™ or Silverlight™ from Microsoft Corporation of Redmond, Wash., Quicktime™ from Apple Computer of Cupertino, Calif., and Flash Video™ from Adobe Systems, Inc. of San Jose, Calif. Client 50 may directly or indirectly instruct media player 46 to present video content. For example, client 50 may directly instruct media player 46 to present video content by inputting a Uniform Resource Locator associated with the video content into a prompt presented by media player 46. In a second example, client 50 may indirectly instruct media player 46 to present video content by navigating a web browser application to a web page in which the video content is embedded. In this second example, the web browser application may automatically instruct media player 46 to present the video content.

When media player 46 is instructed to present video content, media player 46 may directly or indirectly instruct download agent 48 to retrieve the video content. For example, media player 46 may use inter-process communication to directly instruct download agent 48 to retrieve the video content. In another example, media player 46 may instruct an operating system of client device 18A to retrieve the video content. In this example, the operating system may instruct download agent 48 to retrieve the video content.

In some examples, when download agent 48 is instructed to retrieve the video content, download agent 48 may cause network interface 38 to output a video content request to server 12 via network 8. The request may establish one or more TCP/IP connections with server 12 and may specify one or more resource identifiers, such as a file name, of the video content. For example, download agent 48 may cause network interface 38 to output a Hypertext Transfer Protocol (HTTP) request that specifies a Uniform Resource Locator (URL) of the video content, for example, http://www.example.com/mediafile1.flv and http://www.example.com/mediafile2.flv, if client device 18A establishes two TCP/IP connections with server 12.

The number of TCP/IP connections that client device 18A establishes with server 12 is a function of the throughput rate of client device 18A. If the throughput rate is relatively high, client device 18A may establish multiple TCP/IP connections with server 12. If the throughput rate is relatively low, client device 18A may establish fewer, possibly only one, TCP/IP connections with server 12.

In examples where download agent 48 downloads only one video data stream from the plurality of video data streams stored on server 12, download agent 48 decodes the video data stream for presentment on media player 46 to client 50. In examples where download agent 48 downloads two or more video data streams from the plurality of video data streams stored on server 12, download agent 48 combines the two or more video data streams and decodes the combined two or more data streams for presentment on media player 46 to client 50.

Download agent 48 may also monitor the throughput rate of client device 18A. If the throughput rate increases, during download of one or more video data streams, download agent 48 may try to establish another TCP/IP connection with server 12. If the throughput rate has not increased sufficiently, download agent 48 may fail in establishing the additional TCP/IP connection with server 12. However, if the throughput rate has increased sufficiently, download agent 48 may succeed in establishing the additional TCP/IP connection with server 12.

During download, download agent 48 may also monitor the timestamps and/or datastamps associated with each frame of the plurality of video data streams. Download agent 48 may initially download the metadata stored on server 12 before commencing the download of the video content, in examples where the video content of the video data stream is not live content. In other examples, where the metadata is not available for separate download, i.e., in examples where the video content is live content, download agent 48 may monitor the timestamps and/or datastamps associated with each frame of the plurality of video data streams based on the timestamp and/or datastamp provided as headers in each frame. Download agent 48 may monitor which frames have been downloaded so far and the timestamp and/or datastamp for the latest downloaded frame.

If download agent 48 successfully establishes another TCP/IP connection, download agent 48 may begin download of another video data stream via the newly established TCP/IP connection, in addition to the video data streams that download agent 48 is currently downloading. Download agent 48 may request for the frame that immediately follows the latest frame that was downloaded via the newly established TCP/IP connection. Download agent 48 may then continue to download the frames for the plurality of video data streams via each TCP/IP connection.

For example, assume download agent 48 is currently downloading the first video data stream and the second video data stream provided by server 12 via network links 14A and 14B. When the throughput rate of client device 18A rises to a sufficient level, download agent 48 may establish another TCP/IP connection with server 12, e.g., via network link 14C. Further assume that download agent 48 has downloaded up to 500 bits from each of network links 14A and 14B, i.e., download agent 48 has downloaded 500 bits of video content provided by the first video data stream and the second video data stream.

Download agent 48 may make the determination that it has downloaded 500 bits based on the datastamps provided by server 12. Download agent 48 may then transmit a request to server 12 to download 500 bits and on from the third video data stream via network link 14C. Accordingly, download agent 48 may download the first 500 bits from the first and second video data streams via network links 14A and 14B, and may download 500 bits and on from the first, second, and third video data streams via network links 14A, 14B, and 14C. Download agent 48 may combine the first, second, and third video data streams to generate a combined video data stream for presentment to client 50 via media player 46.

As described above, download agent 48 monitors the throughput rate of client device 18A. In some examples, rather than the throughput rate increasing, the throughput rate may decrease. In such examples, if download agent 48 has established multiple TCP/IP connections with server 12, download agent 48 may drop the necessary numbers of TCP/IP connections with server 12 such that the rate at which download agent 48 receives video content is less than or equal to the throughput rate. Download agent 48 may continue to download video content from the TCP/IP connections that are still established with server 12.

Figure 6:
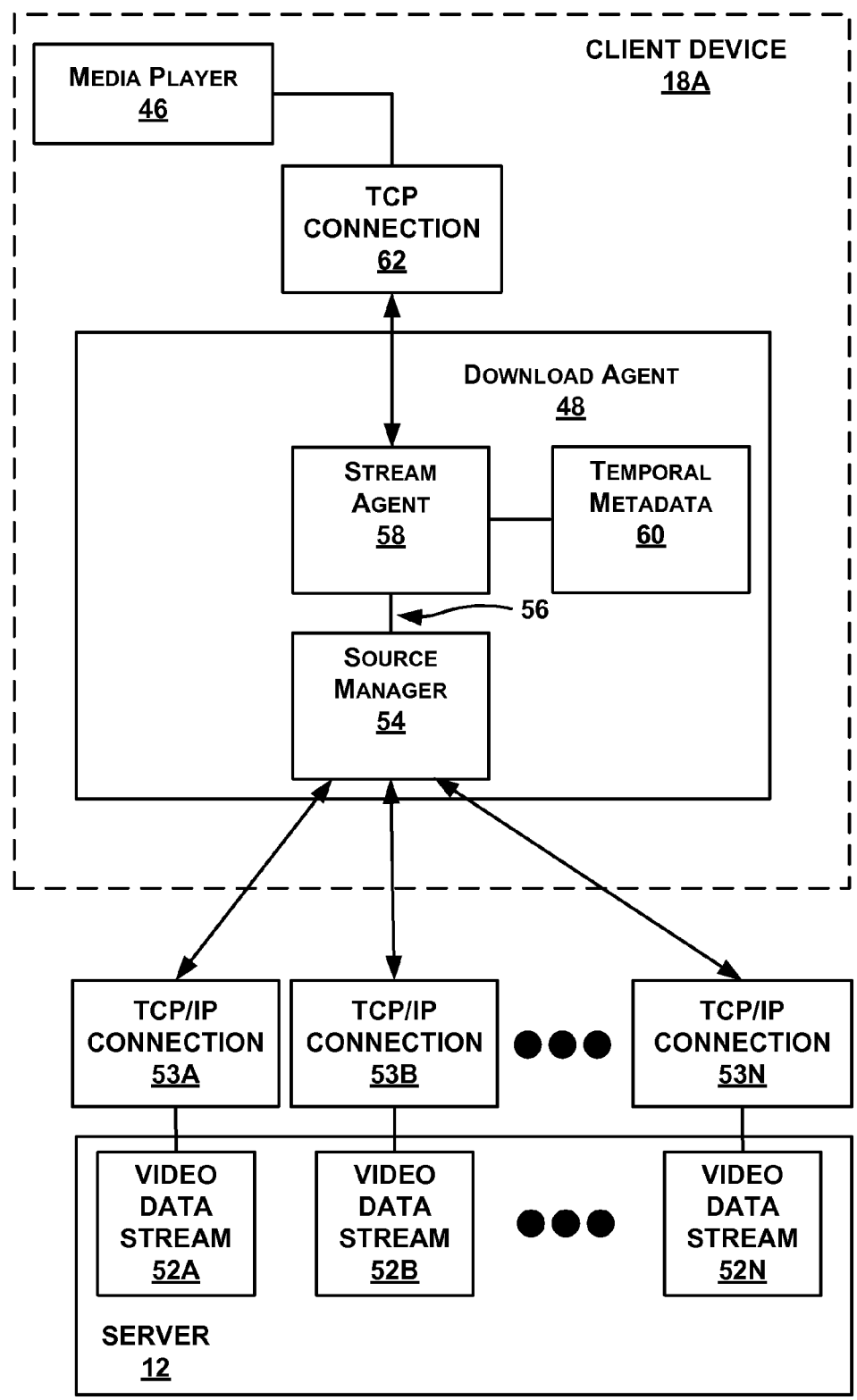
FIG. 6 is a block diagram illustrating an exemplary download agent connected to a media server.

FIG. 6 is a block diagram illustrating an exemplary download agent 48 connected to a media server 12. For clarity, the other components on client device 18A have been omitted to show the relationship between download agent 48 and media server 12. In the example shown in FIG. 6, download agent 48 includes source manager 54, stream agent 58, and temporal metadata 60. For purpose of example, media player 46 is shown as external to download agent 48, however, as described above, download agent 48 may encapsulate media player 46.

As shown in FIG. 6, download agent 48 provides content to media player 46 via a single TCP connection 62 internal to client device 18A. Download agent 48 may, for example, open and maintain a single socket connection for communication of downloaded media content to media player via TCP connection 62. In this example, TCP connection 62 may be a standard transmission control protocol (TCP) connection used in Open Systems Interconnection Basic Reference Model (OSI). TCP connection 62 remains constant between media player 46 and download agent 48. TCP connection 62 is provided for illustration purposes only. In other examples, download agent 48 may provide content to media player 46 using any transfer technique. As described in more detail below, in examples where client device 18A downloads two or more video data streams from server 12, stream agent 58 of download agent 48 seamlessly recomposes two or more video data streams for presentment via media player 46. Recomposing two or more video data streams may comprise combining frames of two or more video data streams into a recomposed frame for presentment via media player 46.

In examples where client device 18A downloads one video data stream from server 12, steam agent 58 recomposes the video data stream for presentment via media player 46. Stream agent 58 provides the recomposed video data stream onto TCP connection 62 so that media player 46 is unaware of any combination of video data streams selected by download agent 48. In some examples, download agent 48 provides the recomposed video data stream to media player 46 at substantially the same rate as the playback rate of the recomposed video data stream. Download agent 48 meters the playback rate of the recomposed video data stream to provide the recomposed video data stream to media player 46 at substantially the same rate as the playback rate of the recomposed video data stream. In this manner, download agent 48 uniformly provides data to media player 46 rather than in bursts of data.

Source manager 54 handles connection management for access and retrieval of video data streams 52A-52N (collectively video data streams 52) within media server 12. Video data streams 52 may be substantially similar to the first, second, third, and fourth video data streams of FIG. 2. Source manager 54 establishes one or more TCP/IP connections 53A-53N (collectively TCP/IP connections 53) with server 12. TCP/IP connections 53A-53N are provided for example purposes only and aspects of this disclosure should not be considered limited to TCP/IP connections. Other types network connections may be used in accordance with this disclosure. TCP/IP connections 53 may be substantially similar to network links 14 (FIGS. 1 and 2). Source manager 54 handles all specific implementation details for acquiring the video content and providing the video content from the video data streams 52 to stream agent 58. In this example, source manager 54 implements a plurality of TCP network stacks and may concurrently handle multiple TCP/IP connections 53 to media server 12.

In some examples, source manager 54 monitors the throughput rate of client device 18A. Based on the throughput rate, source manager 54 may try and establish one or more TCP/IP connections 53. For example, the throughput rate of client device 18A may be sufficient to establish at least one TCP/IP connection 53 with server 12 to download one of video data streams 52. As the throughput rate increases, source manager 54 may try and establish another TCP/IP connection 53 to download another one of video data streams 52. In some examples, source manager 54 may set multiple throughput rate thresholds at different throughput rate levels. If the throughput rate exceeds one of the throughput rate levels, source manager 54 may establish another TCP/IP connection 53 with server 12. If the throughput rate keeps increasing and exceeds another one of the throughput rate levels, source manager 54 may establish another TCP/IP connection 53.

Conversely, if the throughput rate decreases below one of the throughput rate levels, source manager 54 may drop one of the established TCP/IP connections 53. If the throughput rate keeps decreasing and drops below another throughput rate levels, source manager 54 may drop another of the established TCP/IP connections 53.

Setting multiple throughput rate thresholds at different throughput rate levels is provided as one example and should not be considered limiting. Any technique to determine whether additional TCP/IP connections 53 can be established by source manager 54 may be utilized in accordance with this disclosure. For example, assume client device 18A is downloading video data stream 52A, source manager 54 may monitor the throughput rate, and when the throughput rate increases, source manager 54 may query server 12 to determine the bit rate of video data streams 52B-52N. If the bit rate of any of video data streams 52B-52N plus the bit rate of data currently being downloaded by source manager 54 is less than the throughput rate, source manager 54 may establish another TCP/IP connection 53 to download another one of video data streams 52. As described above, the bit rate of video data streams 52 is different than the playback rate of video data streams 52. In the preceding example, server 12 may store the bit rates of video data streams 52 and may be configured to provide the bit rates of the video data streams 52.

Source manager 54 provides the video data streams 52 to stream agent 58 via link 56. In some examples, after source manager 54 establishes TCP/IP connections 53 with server 12 to download video data streams 52, stream agent 58 may request for the metadata stored in server 12. Again, the metadata may comprise timestamps and/or datastamps for each frame of video data streams 52. In some examples, the metadata may also comprise an indication of which pixels of the source video data stream are represented in each one of video data streams 52. Stream agent 58 may provide the stored metadata to temporal metadata 60.

As described above, in some examples, the metadata may not be available for separate download from server 52. In such examples, as stream agent 58 receives video data streams 52, stream agent 58 may determine how many frames have been received so far and the timestamp and/or datastamp for each frame of video data streams 52. Stream agent 58 may store the number of frames that have been received so far and their associated timestamps and/or datastamps in temporal metadata 60. Also, in examples where the metadata is not separately downloadable, each one of video data streams 52 may include, as metadata, an indication of which pixels of the source video data stream are provided in the video data stream.

As described above with respect to FIG. 2 and FIGS. 4A-4E, encoding units 20 decompose one or more frames of the source video data streams to generate frames for the video data streams. In examples where stream agent 58 receives only one of video data streams 52, stream agent 58 recomposes the frames for presentment via media player 46. To recompose a frame, stream agent 58 may first determine the 2 dimensional size of the decomposed frame. The size may be available as metadata, as described above with respect to FIGS. 4A-4E. For example, as shown in FIGS. 4B-4E, the size of decomposed bitmap frame 30 is 4×4.

Next, stream agent 58 may determine a desired size of the recomposed frame. The desired size of the recomposed frame may be calculated from the metadata. For example, as described above, the metadata may include an indication of the size of the decomposed frames, e.g., 4×4 as shown in FIGS. 4B-4E. The metadata may also include an indication of size of the blocks used to divide the frame of the source video data stream, e.g., bitmap frame 28 of FIG. 4A was divided into blocks of 2×2. Stream agent 58 may multiply the size of the blocks, e.g., 2×2, with the size of the decomposed frame, e.g., 4×4, to generate the desired size of the recomposed frame, e.g., 8×8.

Stream agent 58 may generate a virtual frame with yet to be defined pixels. The size of the virtual frame may be the desired size of the recomposed frame. Stream agent 58 may divide the virtual frame similar to the manner in which the source video data frame was divided, e.g., blocks of 2×2. As described above, the size of the blocks may be provided as metadata. Stream agent 58 may determine how many pixels in the virtual frame are represented by one pixel in the decomposed frame based on the size of each block used to divide the virtual frame. Accordingly, in this example, stream agent 58 may determine that one pixel in the decomposed frame should represent four pixels in the virtual frame because the size of each block is 2×2 which is 4 pixels.

In a raster scan manner, stream agent 58 may assign all pixels in the top left 2×2 block of the virtual frame the pixel value of the top left pixel of the decomposed frame. Stream agent 58 may assign all pixels in the 2×2 block of the virtual frame immediately to the right of the top left 2×2 block of the virtual frame the pixel value of the pixel immediately to the right of the top left pixel of the decomposed frame. Stream agent 58 may continue the assigning pixel values for each 2×2 block unit it completes assigning pixel values for the bottom right 2×2 block of the virtual frame. In other words, stream agent 58 assigns pixel values for each pixel in the 2×2 blocks of the virtual frame until the pixels in the bottom right 2×2 block are assigned the pixel value of the bottom right pixel in the decomposed frame. After stream agent 58 completes assigning pixel values to the virtual frame, the virtual frame may represent a recomposed frame.

Figure 7A:
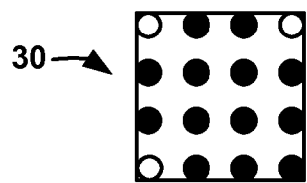
FIGS. 7A and 7B are example illustrations of a decomposed frame recomposed into a frame for presentment via a media player.
Figure 7B:
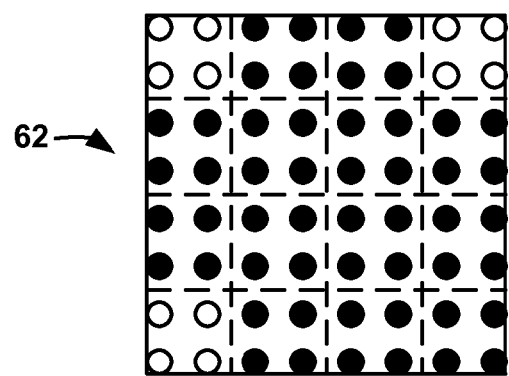

FIGS. 7A and 7B are example illustrations of a decomposed frame that has been recomposed into a frame for presentment via media player 46. As shown in FIG. 7A, the decomposed frame is decomposed bitmap frame 30 (FIG. 4B). In this particular example, to generate virtual bitmap frame 62 of FIG. 7B, stream agent 58 assigns all pixels in the top left 2×2 block of virtual bitmap frame 62 to the pixel value of the top left pixel of decomposed bitmap frame 30. Stream agent 58 then assigns all the pixels in the 2×2 block of virtual bitmap frame 62 immediately to the right of the top left 2×2 block of virtual bitmap frame 62 to the pixel value of the pixel in decomposed bitmap frame 30 that is immediately to the right of the top left pixel in decomposed bitmap frame 30.

Stream agent 58 continues assigning pixel values to 2×2 blocks within virtual bitmap frame 62 until it reaches the bottom right 2×2 block of virtual bitmap frame 62. The pixel value for the bottom right 2×2 block of virtual bitmap frame 62 is the pixel value of the bottom right pixel of decomposed frame 30. After stream agent completes assigning pixel values to each pixel with virtual bitmap frame 62, virtual bitmap frame 62 may be considered as a recomposed bitmap frame. In this manner, stream agent 62 generates a recomposed frame.

Stream agent 58 may provide the recomposed bitmap frame for presentment on media player 46. As described above with respect to FIG. 3, the number of bits needed to transmit a bitmap frame of the source video data stream was 256 bits (8×8×4 bits per pixel). However, in this example, server 12 needed only 64 bits (4×4×4 bits per pixel) to transmit decomposed bitmap frame 30. Stream agent 58 can then recompose decomposed bitmap frame 30 to generate the recomposed bitmap frame. As seen in FIG. 7B, virtual bitmap frame 62, which represents the recomposed bitmap frame, is an approximation of bitmap frame 28 of the source video data stream (FIG. 4A). However, the visual quality of virtual bitmap frame 62 is poorer than the visual quality of bitmap frame 28 because only one frame of the decomposed frames was used to render virtual bitmap frame 62.

In a similar manner, stream agent 58 may generate recomposed frames for the incoming frames of the video data stream. The recomposed frames may be displayed by media player 46. In this manner, client 50 may view the video content stored on server 12.

Referring back to FIG. 6, in some cases, rather than downloading only one of video data streams 52, stream agent 58 may download two or more video data streams 52. In such examples, stream agent 58 recomposes two or more video data streams 52 for presentment via media player 46. To recompose the two or more video data streams 52 for presentment, stream agent 58 may combine frames from each one of video data streams 52 to generate combined frames for presentment in a manner described below. In this manner, stream agent 58 may combine two or more video data streams for presentment. Stream agent 58 may recompose two or more video data streams 52 in a similar manner to recomposing a single video data stream 52.

Stream agent 58 may divide the virtual frame into a plurality of blocks. The size of each block may be the same as the size of a block used to divide the frame of the source video data stream. For example, as before, based on the metadata, stream agent 58 may divide the virtual frame into blocks of 2×2 just like bitmap frame 28 (FIG. 4A). As described above, the metadata for each one of video data streams 52 may include an indication of which pixels in the frames of the source video data stream are represented in the video data stream. For example, as described above with respect to FIG. 4B-4E, the metadata of video data stream 52A may indicate that the pixels in each frame of video data stream 52A represent the pixels located at (1, 1) in each block in the frames of the source video data stream. Similarly, the metadata of video data stream 52B may indicate that the pixels in each frame of video data stream 52B represent the pixels located at (2, 1) in each block in the frames of the source video data stream, and so on.

To recompose two or more video data streams for presentment, stream agent 58 may assign a pixel value to a pixel within a block of the virtual frame based on the pixels represented in the video data streams 52. For example, assume video data stream 52A includes frames that represent the pixels located at (1, 1) in each block of frames of the source video data stream, e.g., bitmap frame 30 (FIG. 4B). Assume video data stream 52B includes frames that represent the pixels located at (2, 1) in each block of frames of the source video data stream, e.g., bitmap frame 32 (FIG. 4C). To recompose video data streams 52A and 52B for presentment, stream agent may combine the frames from the video data streams 52A and 52B into combined frames.

For example, stream agent 58 may assign the pixel located at (1, 1) in the top left block of the virtual frame to the pixel value of the top left pixel in the decomposed frame of video data stream 52A. Stream agent 58 may assign the pixel located at (2, 1) in the top left block of the virtual frame to the pixel value of the top left pixel in the decomposed frame of video data stream 52A. For the remaining two pixels in the top left block of the virtual frame, e.g., pixels located at (1, 2) and (2, 2), stream agent 58 may select one pixel, e.g., the pixel located at (1, 2), and assign it the same pixel value as the pixel value of the pixel located at (1, 1). Stream agent 58 may select the other pixel, e.g., the pixel located at (2, 2), and assign it the same pixel value as the pixel value of the pixel located at (2, 1). In some examples, stream agent 58 may assign the same pixel value of the pixel located at (1, 1) to the pixel located at (2, 2) and assign the same pixel value of the pixel located at (2, 1) to the pixel located at (1, 2). In some other examples, stream agent 58 may assign pixels located at (1, 2) and (2, 2) the same pixel value as the pixel located at (1, 1) or (2, 1).

Stream agent 58 may repeat the previous steps for each block in the virtual frame in a raster scan fashion. For example, for the block immediately to the right of the top left block of the virtual frame, stream agent 58 may select the pixels located immediately to the right of the top left pixel in decomposed frames for video data stream 52A and 52B. For the pixel located at (1, 1) in the block immediately to the right of the top left block of the virtual frame, stream agent may assign that pixel the pixel value of the pixel immediately to the right of the top left pixel in the decomposed frame of video data stream 52A. For the pixel located at (2, 1) in the block immediately to the right of the top left block of the virtual frame, stream agent may assign that pixel the pixel value of the pixel immediately to the right of the top left pixel in the decomposed frame of video data stream 52B.

For the remaining two pixels in the block of the virtual frame immediately to the right of the top left block of the virtual frame, e.g., pixels located at (1, 2) and (2, 2), stream agent 58 may assign those pixels a pixel value of the pixel located at (1, 1) or (2, 1). Stream agent 58 may continue assigning pixel values to each pixel in each block of the virtual frame based on the pixel values in video data stream 52A and 52. In this manner, stream agent 58 may combine a frame from video data stream 52A with a frame from video data stream 52B. The combined frame, e.g., the virtual frame, may represent a recomposed frame.

In examples where client device 18A downloads more than two video data streams, stream agent 58 may recompose the video data streams in a substantially similar fashion. Stream agent 58 may provide the recomposed video data stream to media player 46 for presentment to client 50. In some examples, the visual quality of the recomposed video data streams may be poorer than the visual quality of the source video data stream. However, server 12 may not need to consume as much bandwidth on network 16 to provide the video content.

For example, assume that in a conventional system, server 12 needed to transmit one version of the video content configured for a 2 Mbps playback rate and another version of the video content configured for a 1 Mbps playback rate to accommodate the throughput rates for different client devices 18. Client device 18A may have sufficient throughput rate to download the 2 Mbps playback rate version, and client device 18B may only have sufficient throughput rate to download the 1 Mbps playback rate version. Accordingly, in the conventional system, server 12 may need to consume sufficient bandwidth to transmit both the 2 Mbps playback rate version and the 1 Mbps playback rate version.

However, in accordance with this disclosure, each one of video data streams 52 may be configured for a 1 Mbps playback rate. Accordingly, client device 18A may download video data streams 52A and 52B and client device 18B may download video data stream 52A. Client device 18A may recompose video data streams 52A and 52B. Accordingly, in accordance with this disclosure, server 12 may need to consume sufficient bandwidth to transmit two 1 Mbps playback rate versions rather than a 2 Mbps playback rate version and a 1 Mbps playback rate version, as would be the case in a conventional system. In many cases, the media content provider that controls server 12 may pay the service provider that controls network 16 based on the amount of bandwidth that the media content provider utilizes on network 16. By reducing the amount of bandwidth that the media content provider utilizes on network 16, the media content provider may reduce its costs.

Figure 8A:
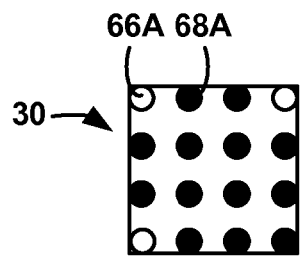
FIGS. 8A, 8B, and 8C are example illustrations of two decomposed frames combined and recomposed into a frame for presentment via a media player.
Figure 8C:
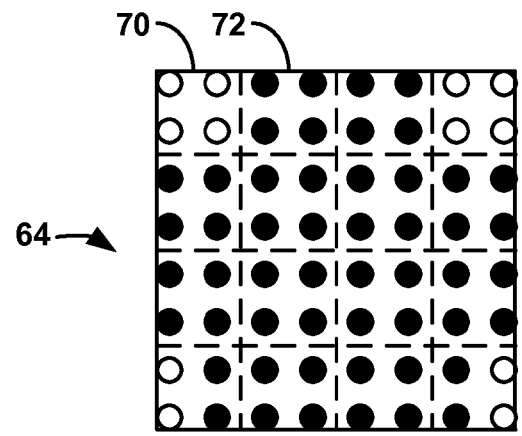
Figure 8B:
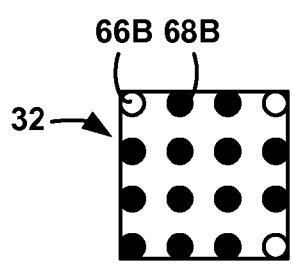

FIGS. 8A, 8B, and 8C are example illustrations of two decomposed frames recomposed into a frame for presentment via media player 46. As shown in FIGS. 8A and 8B, the two decomposed frames are decomposed bitmap frames 30 and 32 (FIGS. 4B and 4C). As described with respect to FIGS. 4B and 4C, bitmap frame 30 includes pixels located at (1, 1) in each block of bitmap frame 28, and bitmap frame 32 includes pixels located at (2, 1) in each block of bitmap frame 28. Bitmap frame 28 is an example of a frame of the source video data stream. To generate a recomposed bitmap frame, stream agent 58 may first generate virtual frame 64 that is the same size of a frame of the source video data stream, as shown in FIG. 8C. Stream agent 58 assigns the pixel located at (1, 1) in the top left 2×2 block 70 of virtual bitmap frame 64 the pixel value of the top left pixel 66A of decomposed bitmap frame 30. Stream agent 58 assigns the pixel located at (2, 1) in block 70 of virtual bitmap frame 64 the pixel value of the top left pixel 66B of decomposed bitmap frame 32. In the example of FIG. 8C, stream agent 58 assigns the pixel located at (1, 2) of block 70 of virtual bitmap frame 64 the pixel value of the pixel located at (1, 1) of block 70 of virtual bitmap frame 64. Stream agent 58 assigns the pixel located at (2, 2) of block 70 of virtual bitmap frame 64 the pixel value of the pixel located at (2, 1) of block 70 of the virtual bitmap frame 64.

For block 72 of virtual bitmap frame 64, which is immediately to the right of block 70 of virtual bitmap frame 64, stream agent 58 assigns the pixel located at (1, 1) in block 72 of virtual frame 64 the pixel value of pixel 68A of decomposed bitmap frame 30, which is immediately to the right of pixel 66A. Stream agent 58 assigns the pixel located at (2, 1) in block 72 of virtual bitmap frame 64 the pixel value of pixel 68B of decomposed bitmap frame 32, which is immediately to the right of pixel 66B. In the example of FIG. 8C, stream agent 58 assigns the pixel located at (1, 2) of block 72 of virtual bitmap frame 64 the pixel value of the pixel located at (1, 1) of block 72 of virtual bitmap frame 64. Stream agent 58 assigns the pixel located at (2, 2) of block 72 of virtual bitmap frame 64 the pixel value of the pixel located at (2, 1) of block 72 of the virtual bitmap frame 64.

In a raster scan manner, stream agent 58 may assign pixel values for each pixel within each block of virtual bitmap frame 64 in a substantially similar manner as described above. Upon completion, virtual bitmap frame 64 may represent a recomposed frame. In this manner, stream agent 58 generates the recomposed bitmap frame by combining decomposed frames. Stream agent 58 may generate recomposed bitmap frames in a substantially similar manner for incoming frames from video data streams 52A and 52B. Stream agent 58 may provide the recomposed bitmap frames to media player 46 for presentment. In this manner, client 50 may view the video content.

As shown in FIG. 8C, virtual bitmap frame 64, which represents a recomposed bitmap frame, is substantially similar to the original frame of the source video data stream, e.g., bitmap frame 28 of FIG. 4A. However, the visual quality of virtual bitmap frame 64 may be poorer than bitmap frame 28 because virtual bitmap frame 64 is generated based on only two of the four decomposed frames. Furthermore, in some examples, the visual quality of the frame generated by combining and recomposing two or more video data streams 52 may be higher than the visual quality of the frame generated by recomposing only one of video data streams 52. For example, virtual bitmap frame 64 better approximates bitmap frame 28 than virtual bitmap frame 62 (FIG. 7B) because virtual bitmap frame 64 was generated based on two of the four decomposed frames, while virtual bitmap frame 62 was generated based on one of the four decomposed frames. Again, virtual bitmap frame 64 and virtual bitmap frame 62 represent two different recomposed frames.

Referring back to FIG. 6, as described so far, in one example, download agent 48 via source manager 54 and stream agent 58 may download one of video data streams 52 and recompose the video data stream for presentment via media player 46. In another example, download agent 48 via source manager 54 and stream agent 58 may download two or more video data streams 52 and generate recomposed frames based on the decomposed frames of the video data streams 52 for presentment via media player 46. In some examples, in addition to recomposing a video data stream or a plurality of video data streams, download agent 48 may also dynamically establish additional TCP/IP connections or terminate, i.e., close, currently open TCP/IP connections during download.

As described above, in some instances, the throughput rate of client device 18A may increase. As the throughput rate increases, source manager 54 may establish, i.e., open, additional TCP/IP connections 53 with server 12 to download one or more additional video data streams 52. Also, as described above, stream agent 58 may monitor how many frames have been downloaded so far from the currently opened TCP/IP connections 53 based on the timestamps and/or datastamps. Upon establishing another TCP/IP connection 53 with server 12, stream agent 58 may determine how many frames have been downloaded so far. Stream agent 58 may query temporal metadata 60 to determine the timestamp and/or datastamp for the last downloaded frame or frames, in examples where download agent 48 is downloading two or more video data streams 52.

Stream agent 58, via source manager 54, may transmit a request on the newly established TCP/IP connection 53 for frames that are subsequent to the latest received frame. For example, stream agent 58 may transmit a GET command to server 12 to receive data that is immediately subsequent to the datastamp of the latest received frame or frames via the newly established TCP/IP connection 53. In response, server 12 may transmit the video data stream 52 that is associated with the newly established TCP/IP connection 53. In particular, server 12 may transmit the data based on the GET command that indicates the starting point of the video data stream. Stream agent 58 may then recompose frames of the video data streams 52 in a similar manner as described above.

In some examples, rather than the throughput rate increasing, the throughput rate for client device 18A may decrease. In such instances, source manager 54 may terminate, i.e., close, one of the TCP/IP connections 53 that was previously established. Stream agent 58 may recompose frames of video data streams 52 that are provided via open TCP/IP connections 53.

Notably, media player 46 may be oblivious to the dynamic functions of download agent 48. Accordingly, client 50 may be oblivious to the recomposing acts of download agent 48. In this manner, client 50 may experience uninterrupted playback of the video content.

Figure 9:
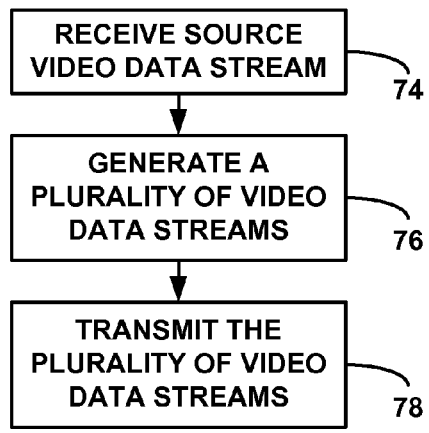
FIG. 9 is a flowchart illustrating an example operation of server.

FIG. 9 is a flowchart illustrating an example operation of server 12. For purposes of illustration, reference is made to FIG. 2. Each one encoding units 20 may receive the source video data stream (74). The source video data stream may be stored on memory 20 or may be provided by an external device. Each one encoding units 20 may generate a video data stream based on the source video data stream to generate a plurality of video data streams (76). Server 12 may transmit the plurality of video data streams via network links 14 (78).

Figure 10:
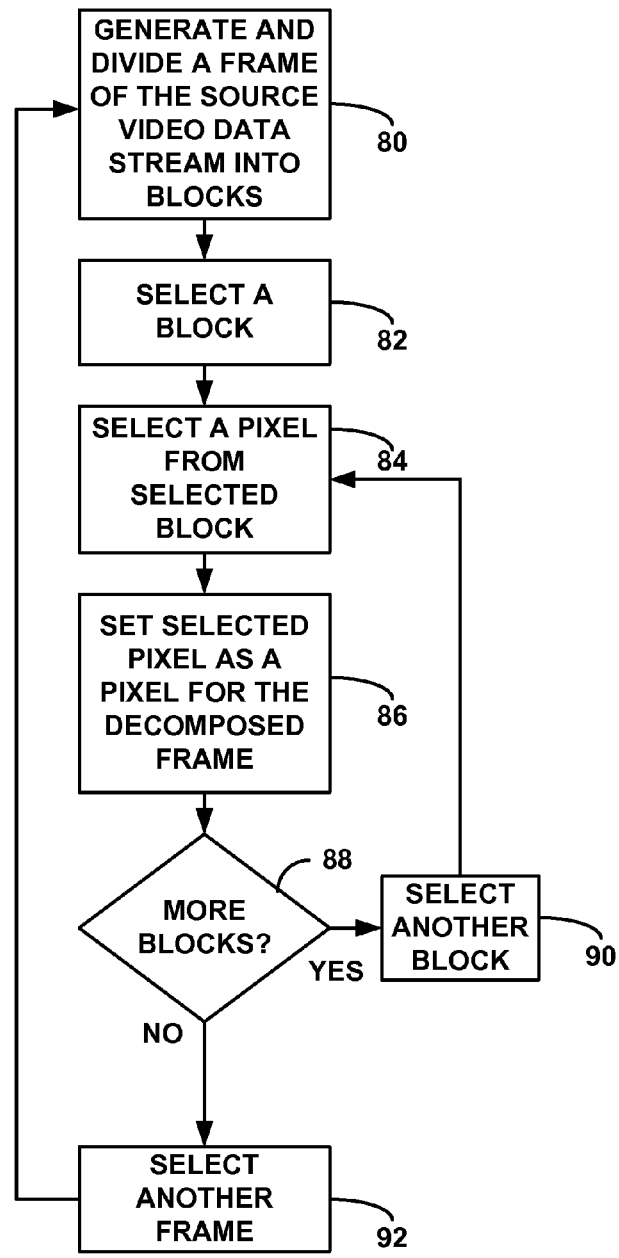
FIG. 10 is a flowchart illustrating an example operation of encoding unit.

FIG. 10 is a flowchart illustrating an example operation of encoding unit 20A. For purposes of illustration only, reference is made to FIG. 2. Encoding unit 20A receives a frame of the source video data stream and divides the frame into a plurality of blocks (80). Encoding unit 20A selects a block of the plurality of blocks (82). As one example, the selected block may be the block in the top left of the frame. Encoding unit 20A selects a pixel within the selected block (84). As one example, the selected pixel may be the pixel in the top left of the selected block. Encoding unit 20A may then set the pixel value of the selected pixel as a pixel value for a pixel within the frame that encoding units 20A generates, i.e., the decomposed frame (86). Encoding unit 20A may determine whether there are additional blocks in the frame of the source video data stream that have not been selected yet (88).

If there are more blocks (YES of 88), encoding unit 20A may select another block in frame of the source video data stream (90). As one example, encoding unit 20A may select the block that is immediately to the right of the previously selected block. If the previously selected block is at the end of the frame of the source video data stream, encoding unit 20A may select the block that is immediately below a block on the other end of the frame in the same row as the previously selected block, i.e., in a raster scan manner. Encoding unit 20A may then select a pixel within the newly selected block (84). The selected pixel may be in the same corresponding location as the selected pixel in the previous block. For example, encoding unit 20A selected the pixel located at (1, 1) in the previously selected block, encoding unit 20A may select the pixel located at (1, 1) in the newly selected block.

Encoding unit 20A may then set the selected pixel of the newly selected block as a pixel in the decomposed frame (86). The pixel in the decomposed frame is different the previous pixel in the decomposed frame. Encoding unit 20A then determines again whether there are more blocks in the frame of the source video data stream. Encoding unit 20A repeats acts 90, 84, 86, and 88 until there are no more blocks within the frame of the source video data stream.

After encoding unit 20A determines that there are no more blocks within the frame of the source video data stream (NO of 88), encoding unit 20A may select the immediately subsequent frame of the source video data stream (92). Encoding unit 20A may perform act 80 through act 90 until encoding unit has encoded all the frames of the source video data stream.

Encoding units 20B-20D may function substantially similar to encoding unit 20A. However, at act 84, encoding units 20B-20D may select a pixel within the block that is different the pixel selected by encoding unit 20A. Furthermore, each one of encoding units 20A-20D, at act 84, may select a different pixel than a pixel selected by any of the other encoding units 20.

Figure 11:
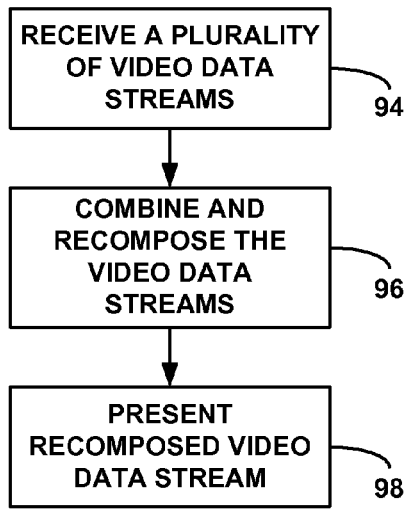
FIG. 11 is a flowchart illustrating an example operation of a client device.

FIG. 11 is a flowchart illustrating an example operation of client device 18A. For purposes of illustration only, reference is made to FIG. 6. Source manager 54 receives a plurality of video data streams 52 via TCP/IP connections 53 (94). Stream agent 58 recomposes frames of the plurality of video data streams 52 to generate a recomposed video data stream (96). Stream agent 58 provides the recomposed video data stream to media player 46 for presentment to client 50 (98).

Figure 12:
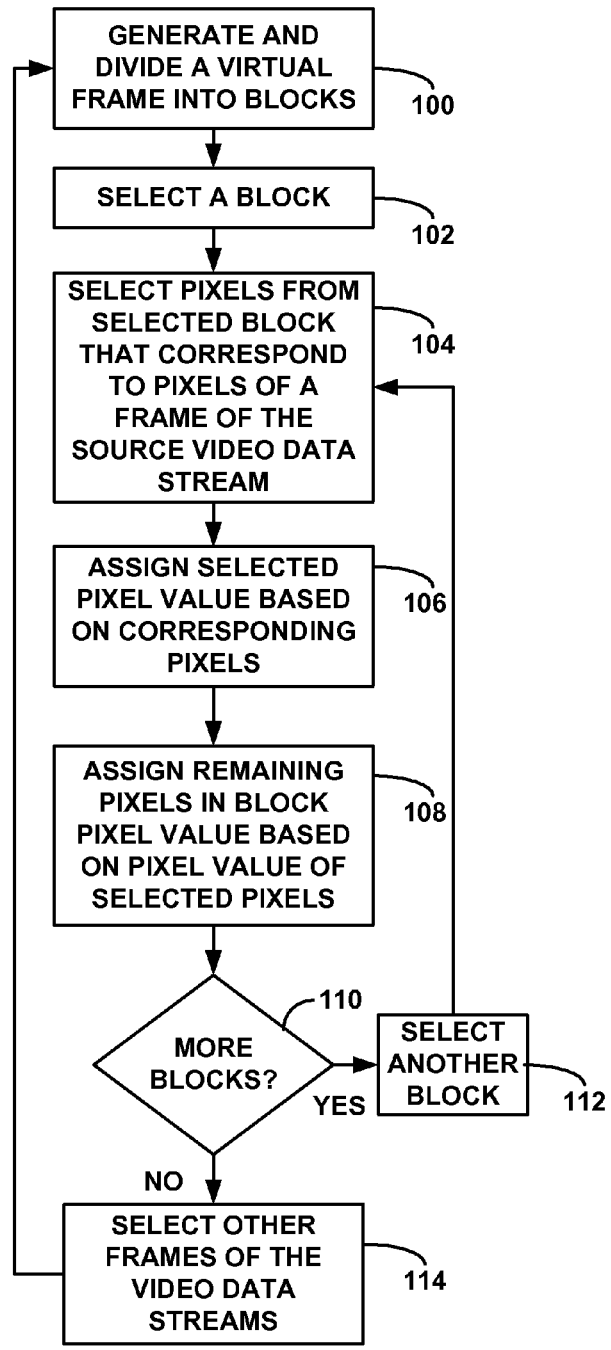
FIG. 12 is a flowchart illustrating an example operation of stream agent.

FIG. 12 is a flowchart illustrating an example operation of stream agent 58. For purposes of illustration only, reference is made to FIG. 6. In the flowchart of FIG. 12, client device 18A is downloading two or more video data stream 52. Stream agent 58 generates a virtual frame and divides the virtual frame into a plurality of blocks (100). Upon generation, the virtual frame may not include pixel values for the pixels within the frame. The size of the virtual frame is based on metadata provided by video data streams 52. The size of each block of the plurality of blocks may be the same size as blocks of a frame of the source video data stream. The metadata of video data streams 52 may include a size of the blocks of a frame of the source video data stream.

Stream agent 58 may select a block of the plurality of blocks (102). As one example, stream agent 58 selects the block in the top left of the virtual frame. Stream agent 58 may then select pixels within the selected block that correspond to pixels of a frame of the source video data stream (104). Each one of video data streams 52 may include, as metadata, an indication of which pixels from a frame of the source video data stream are provided in the video data stream. For example, video data stream 52A may include metadata that indicates that video data stream 52A includes pixels located at (1, 1) in all blocks of a frame of the source video data stream. Video data stream 52B may include metadata that indicates that video data stream 52B includes pixels located at (2, 1) in all blocks of a frame of the source video data stream. Accordingly, stream agent 58 may select pixels located at (1, 1) and (2, 1) in the selected block.

Stream agent 58 may then assign the selected pixels pixel values from corresponding pixels in the video data streams (106). For example, stream agent 58 may assign the pixel located at (1, 1) in the selected block the pixel value of the pixel located at the top left of a frame of video data stream 52A. Stream agent 58 may assign the pixel located at (2, 1) in the selected block the pixel value of the pixel located at the top left of a frame of video data stream 52B.

Stream agent 58 may then assign the remaining pixels in the selected block a pixel value based on the pixel values already assigned to the selected pixels (108). For example, for the remaining pixels in the selected block, stream agent 58 may assign all remaining pixels the pixel value of the pixel located at (1, 1) or (2, 1). Or, stream agent 58 may assign some of the remaining pixels the pixel value of the pixel located at (1, 1) and the others the pixel value of the pixel located at (2, 1).

Stream agent 58 may then determine whether there are additional blocks within the virtual frame that have yet to be selected (110). If there are more blocks (YES of 110), stream agent 58 may select another block in virtual frame (112). As one example, stream agent 58 may select the block that is immediately to the right of the previously selected block. If the previously selected block is at the end of the virtual frame, stream agent 58 may select the block that is immediately below a block on the other end of the frame in the same row as the previously selected block, i.e., in a raster scan manner. Stream agent 58 may then select pixels within the selected block that correspond to pixels of a frame of the source video data stream (104). Stream agent 58 may then repeat acts 104-112 until there are no more blocks within the recomposed frame. The resulting virtual frame may represent the recomposed frame. In this manner, stream agent 58 may recompose frames at least two video data streams to generate a recomposed frame. The recomposed frame may be a part of a recomposed data stream.

After stream agent 58 determines that there are no more blocks within the virtual frame (NO of 110), stream agent 58 may select the immediately subsequent frames the video data streams (114). Stream agent 58 may perform act 100 through act 112 until stream agent 58 has recomposed all the frames of the video data streams 52 that client device 18A is downloading. The recomposed frames may form the recomposed data stream for presentment.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory ("RAM") such as synchronous dynamic random access memory ("SDRAM"), read-only memory ("ROM"), non-volatile random access memory ("NVRAM"), electrically erasable programmable read-only memory ("EEPROM"), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors ("DSPs"), general purpose microprocessors, application-specific integrated circuits ("ASICs"), field programmable logic arrays ("FPGAs"), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder ("CODEC").

Various aspects of the disclosure have been described. These and other aspects are within the scope of the following claims.

The invention claimed is:

1. A method comprising:
   decomposing, by a device including a processor, a plurality of frames of a source video data stream, representing a version of video content, into a plurality of additional video data streams respectively representing additional versions of the video content, wherein the respective additional video data streams are of lower quality than the source video data stream, any two or more of the additional video data streams are combinable to generate a combined video data stream that is of higher quality than the respective additional video data streams, and the respective additional video data streams are based upon distinct assignment of pixels from blocks from which frames of the source video data stream have been divided to the respective additional video data streams;
   generating, by the device, metadata describing the distinct assignment of respective pixels from the blocks to the respective additional video data streams, respective timestamps identifying time positions of each frame of the respective additional video data streams or respective datastamps identifying byte positions of each frame of the respective additional video data streams and at least one of respective sizes of the blocks or respective quantities of blocks per frame of the source video data stream; and
   sending, by the device, the metadata to a client device.

2. The method of claim 1, wherein the source video data stream is configured for a source video playback rate, wherein the respective additional video data streams are configured for respective additional playback rates that are less than the source video playback rate.

3. The method of claim 1, wherein decomposing the plurality of frames of the source video data stream comprises:
   dividing respective frames of the plurality of frames into a plurality of blocks having a pixel size corresponding to a quantity of the additional video data streams;
   assigning respective distinct pixels from respective blocks to the respective additional video data stream.

4. The method of claim 1, further comprising:
   receiving, by the device, a request for one or more of the additional video data streams from the client device based upon the metadata and a current throughput rate of the client device, wherein the request includes requests for respective frames of the additional video data streams having timestamps or datastamps immediately subsequent to a timestamp or datastamp of a received frame of a video data stream currently being received by the client device; and
   transmitting, by the device, the one or more additional video data streams, at the respective frames of the additional video data streams having timestamps or datastamps immediately subsequent to the timestamp or datastamp of the received frame of the video data stream currently being received by the client device, to the client device.

5. A system comprising:
a processor; and
a memory communicatively coupled to the processor, the memory having stored therein computer-executable instructions, comprising:
at least one encoding unit configured to:
decompose a plurality of frames of a source video data stream, representing a version of video content, into a plurality of additional video data streams respectively representing additional versions of the video content, wherein the respective additional video data streams are of lower quality than the source video data stream, any two or more of the additional video data streams are combinable to generate a combined video data stream that is of higher quality than the respective additional video data streams, and the respective additional video data streams are based upon distinct assignment of pixels from blocks from which frames of the source video data stream have been divided to the respective additional video data streams; and
generating metadata describing the distinct assignment of respective pixels from the blocks to the respective additional video data streams, respective timestamps identifying time positions of each frame of the respective additional video data streams or respective datastamps identifying byte positions of each frame of the respective additional video data streams and at least one of respective sizes of the blocks or respective quantities of blocks per frame of the source video data stream; and
a transmitter configured to send the metadata to a client device.

6. The system of claim 5, wherein the source video data stream is configured for a source video playback rate, wherein the respective additional video data streams are configured for respective additional playback rates that are less than the source video playback rate.

7. The system of claim 5, wherein the at least one encoding unit is further configured to:
divide respective frames of the plurality of frames into a plurality of blocks having a pixel size corresponding to a quantity of the additional video data streams; and
assign respective distinct pixels from respective blocks to the respective additional video data stream.

8. The system of claim 5, further comprising:
a receiver configured to receive a request for one or more of the additional video data streams from the client device based upon the metadata and a current throughput rate of the client device, wherein the request includes requests for respective frames of the additional video data streams having timestamps or datastamps immediately subsequent to a timestamp or datastamp of a received frame of a video data stream currently being received by the client device,
wherein the transmitter is further configured to transmit the one or more additional video data streams, at the respective frames of the additional video data streams having timestamps or datastamps immediately subsequent to the timestamp or datastamp of the received frame of the video data stream currently being received by the client device, to the client device in response to the receiver receiving the request.

9. A non-transitory computer-readable medium having instructions stored thereon that, in response to execution, cause at least one device including a processor to perform operations comprising:
decomposing a plurality of frames of a source video data stream, representing a version of video content, into a plurality of additional video data streams respectively representing additional versions of the video content, wherein the respective additional video data streams are of lower quality than the source video data stream, any two or more of the additional video data streams are combinable to generate a combined video data stream that is of higher quality than the respective additional video data streams, and the respective additional video data streams are based upon distinct assignment of pixels from blocks from which frames of the source video data stream have been divided to the respective additional video data streams;
generating metadata describing the distinct assignment of respective pixels from the blocks to the respective additional video data streams, respective timestamps identifying time positions of each frame of the respective additional video data streams or respective datastamps identifying byte positions of each frame of the respective additional video data streams and at least one of respective sizes of the blocks or respective quantities of blocks per frame of the source video data stream; and
sending the metadata to a client device.

10. A method comprising:
receiving, by a client device including a processor, metadata describing a plurality of additional video data streams decomposed from a plurality of frames of a source video data stream that represents a version of video content, wherein the additional video data streams represent additional versions of the video content, the respective additional video data streams are of lower quality than the source video data stream, any two or more of the additional video data streams are combinable to generate a combined video data stream that is of higher quality than the respective additional video data streams, the respective additional video data streams are based upon distinct assignment of pixels from blocks from which frames of the source video data stream have been divided, and the metadata further describes the distinct assignment of respective pixels from the blocks to the respective additional video data streams, and respective timestamps identifying time positions of each frame of the respective additional video data streams or respective datastamps identifying byte positions of each frame of the respective additional video data streams and at least one of respective sizes of the blocks or respective quantities of blocks per frame of the source video data stream;
determining, by the client device, a current throughput rate;
determining, by the client device, a quantity of the additional video data streams to download based upon the current throughput rate and the metadata; and
downloading, by the client device, the quantity of additional video data streams.

11. The method of claim 10, wherein the metadata further describes respective bit rates of the respective additional video data streams, and the determining the quantity further comprises determining the quantity of additional video data streams that have a combined bit rate that does not exceed the current throughput rate.

12. The method of claim 10, wherein the downloading further comprises:

establishing a number of concurrent network connections equaling the quantity;
downloading the respective additional video streams on distinct network connections of the concurrent network connections.

13. The method of claim 10, further comprising:
monitoring, by the client device, the throughput rate;
in response to an in increase in the throughput rate, increasing, by the client device, the quantity, and downloading, by the client device, the increased quantity of additional video data streams.

14. The method of claim 10, further comprising:
monitoring, by the client device, the throughput rate; and
in response to a decrease in the throughput rate and the quantity being greater than one, decreasing, by the client device, the quantity, and downloading, by the client device, the decreased quantity of additional video data streams.

15. The method of claim 10, further comprising combining the downloaded quantity of additional video data streams into a combined video data stream.

16. The method of claim 10, wherein the downloading the quantity of additional video data streams comprises downloading the quantity of additional video data streams at respective frames of the additional video data streams having timestamps or datastamps immediately subsequent to a timestamp or datastamp of a received frame of a video data stream currently being received by the client device.

17. A client device comprising:
a processor; and
a memory communicatively coupled to the processor, the memory having stored therein computer-executable instructions, comprising:
a download agent configured to receive metadata describing a plurality of additional video data streams decomposed from a plurality of frames of a source video data stream that represents a version of video content, wherein the additional video data streams represent additional versions of the video content, the respective additional video data streams are of lower quality than the source video data stream, any two or more of the additional video data streams are combinable to generate a combined video data stream that is of higher quality than the respective additional video data streams, the respective additional video data streams are based upon distinct assignment of pixels from blocks from which frames of the source video data stream have been divided, and the metadata further describes the distinct assignment of respective pixels from the blocks to the respective additional video data streams, and respective timestamps identifying time positions of each frame of the respective additional video data streams or respective datastamps identifying byte positions of each frame of the respective additional video data streams and at least one of respective sizes of the blocks or respective quantities of blocks per frame of the source video data stream;
a source manager configured to identify a current throughput rate and determine a quantity of the additional video data streams to download based upon the current throughput rate and metadata; and
a stream agent configured to download the quantity of additional video data streams.

18. The client device of claim 17, wherein the metadata further describes respective bit rates of the respective additional video data streams, and the source manager is further configured to determine the quantity of additional video data streams that have a combined bit rate that does not exceed the current throughput rate.

19. The client device of claim 17, wherein the stream agent is further configured to:
establish a number of concurrent network connections equaling the quantity; and
download the respective additional video streams on distinct network connections of the concurrent network connections.

20. The client device of claim 19, wherein:
the source manager is further configured to monitor the throughput rate; and
in response to an in increase in the throughput rate, the source manager is further configured to increase the quantity and the stream agent is further configured to download the increased quantity of additional video data streams.

21. The client device of claim 19, wherein:
the source manager is further configured to monitor a throughput rate; and
in response to a decrease in the throughput rate and the quantity being greater than one, the source manager is further configured to decrease the quantity and the stream agent is further configured to download the decreased quantity of additional video data streams.

22. The client device of claim 17, wherein the download agent is further configured to combine the downloaded quantity of additional video data streams into a combined video data stream.

23. The client device of claim 17, wherein the stream agent further configured to download the quantity of additional video data streams at respective frames of the additional video data streams having timestamps or datastamps immediately subsequent to a timestamp or datastamp of a received frame of a video data stream currently being received by the client device.

24. A non-transitory computer-readable medium having instructions stored thereon that, in response to execution, cause a client device including a processor to perform operations comprising:
receiving metadata describing a plurality of additional video data streams decomposed from a plurality of frames of a source video data stream that represents a version of video content, wherein the additional video data streams represent additional versions of the video content, the respective additional video data streams are of lower quality than the source video data stream, any two or more of the additional video data streams are combinable to generate a combined video data stream that is of higher quality than the respective additional video data streams, the respective additional video data streams are based upon distinct assignment of pixels from blocks from which frames of the source video data stream have been divided to the respective additional video data streams, and the metadata further describes the distinct assignment of respective pixels from the blocks to the respective additional video data streams, respective timestamps identifying time positions of each frame of the respective additional video data streams or respective datastamps identifying byte positions of each frame of the respective additional video data streams and at least one of respective sizes of the blocks or respective quantities of blocks per frame of the source video data stream;
identifying a current throughput rate;

determining a quantity of the additional video data streams to download based upon the current throughput rate and the metadata; and downloading the quantity of additional video data streams.

25. The non-transitory computer-readable medium of claim 24, wherein the downloading the quantity of additional video data streams comprises downloading the quantity of additional video data streams at respective frames of the additional video data streams having timestamps or datastamps immediately subsequent to a timestamp or datastamp of a received frame of a video data stream currently being received by the client device.

26. A system comprising:

means for receiving metadata describing a plurality of additional video data streams decomposed from a plurality of frames of a source video data stream that represents a version of video content, wherein the additional video data streams represent additional versions of the video content, the respective additional video data streams are of lower quality than the source video data stream, any two or more of the additional video data streams are combinable to generate a combined video data stream that is of higher quality than the respective additional video data streams, the respective additional video data streams are based upon distinct assignment of pixels from blocks from which frames of the source video data stream have been divided, and the metadata further describes the distinct assignment of respective pixels from the blocks to the respective additional video data streams, respective timestamps identifying time positions of each frame of the respective additional video data streams or respective datastamps identifying byte positions of each frame of the respective additional video data streams and at least one of respective sizes of the blocks or respective quantities of blocks per frame of the source video data stream;

means for identifying a current throughput rate;

means for determining a quantity of the additional video data streams to download based upon the current throughput rate; and means for downloading the quantity of additional video data streams.

27. The system of claim 26, wherein the means for downloading the quantity of additional video data streams downloads the quantity of additional video data streams at respective frames of the additional video data streams having timestamps or datastamps immediately subsequent to a timestamp or datastamp of a received frame of a video data stream currently being received by a client device.

* * * * *